United States Patent [19]

Koch

[11] 3,816,664

[45] June 11, 1974

[54] SIGNAL COMPRESSION AND EXPANSION APPARATUS WITH MEANS FOR PRESERVING OR VARYING PITCH

[76] Inventor: Richard F. Koch, 67 Smith St., Lynbrook, N.Y. 11563

[22] Filed: Sept. 28, 1971

[21] Appl. No.: 184,371

[52] U.S. Cl. .......................................... 179/15.55 T

[51] Int. Cl. .............................................. H04b 1/66

[58] Field of Search .... 179/1 SA, 15.55 R, 15.55 T; 324/77; 340/148

[56] References Cited

UNITED STATES PATENTS

| | | | |
|---|---|---|---|
| 3,104,284 | 9/1963 | French | 179/15.55 T |
| 3,209,074 | 9/1965 | French | 179/1 SA |
| 3,369,077 | 2/1968 | French | 179/1 SA |
| 3,450,838 | 6/1969 | Bandat | 179/1 SA |
| 3,467,783 | 9/1969 | Magnuski | 179/15.55 R |
| 3,499,996 | 3/1970 | Klayman | 179/15.55 R |
| 3,575,555 | 4/1971 | Schanne | 179/1 SA |
| 3,621,150 | 11/1971 | Pappas | 179/15.55 T |
| 3,681,756 | 8/1972 | Burkhard | 179/1 SA |

OTHER PUBLICATIONS

Rabiner, A Model for Synthesizing Speech by Rule, IEEE Trans. On Audio, Vol. AU-17, No. 1, 3/69, pp. 7–13.

*Primary Examiner*—Kathleen H. Claffy
*Assistant Examiner*—Jon Bradford Leaheey

[57] ABSTRACT

Apparatus for compressing, expanding and reading out audio and other signals while preserving or varying their pitch. The apparatus includes means for discarding segments of the signals and compressing the undiscarded segments or, when desired, repeating certain portions of segments as the signals are being read out to reproduce the signals. The apparatus may also include means for converting the signals into word organized digital signals, storing and reading out the digital signals while discarding or repeating certain segments thereof without losing information content, means for interlacing the reading and writing operations, means for varying the write-in rate and means for varying the read-out rate of the signals so as to control the overall rate and pitch of the output.

30 Claims, 13 Drawing Figures

INVENTOR
RICHARD F. KOCH
BY Eugene E. Geoffrey Jr.
ATTORNEY

INVENTOR
RICHARD F. KOCH
BY [signature]
ATTORNEY

INVENTOR
RICHARD F. KOCH
BY
ATTORNEY

INVENTOR
RICHARD F. KOCH
BY [signature]
ATTORNEY

INVENTOR
RICHARD F. KOCH
BY Eugene E. Geoffrey Jr.
ATTORNEY

INVENTOR
RICHARD F. KOCH
BY Eugene E. Geoffrey Jr.
ATTORNEY

INVENTOR
RICHARD F. KOCH
BY Eugene [signature]
ATTORNEY

INVENTOR
RICHARD F. KOCH
BY
ATTORNEY

SIGNAL COMPRESSION AND EXPANSION APPARATUS WITH MEANS FOR PRESERVING OR VARYING PITCH

This invention relates to signal compression-expansion apparatus generally and more specifically to an electronic compressor-expander which includes means for preserving or varying both the rate and pitch of the audio signals being compressed or expanded.

When an audio or speech signal is recorded, its characteristics are simulated in the recording material. For example, in a phonograph record, the walls of the grooves undulate to represent the sound waves which are recorded. If the record is played back faster or slower than the original recording rate, a listener will receive the information contained in that record in a shorter or greater time than the information was originally generated. Consequently, a listener hears a sound which has a higher or lower pitch than the original. This occurs because an original component in the signal, having a temporal frequency of $f_i$ cycles per second when impressed upon a recording medium at a velocity of $v_i$ inches per second, produces recorded spatial frequency of $F_i$ cycles per inch; that is, $$F_i = f_i / v_i$$

If this recording is played back at a velocity of $v_i$, the spatial frequency $F_i$ will be translated to a temporal frequency $$f_o = F_i\ v_i = (f_i/v_i)v_i = f_i$$

However, if the playback velocity is $v_o \neq v_i$, then $f_o \neq f_i$; that is, $$f_o = (f_i/v_i)v_o = f_i \times (vo/v_i)$$

Thus, the temporal output frequency $f_o$ increases or decreases directly with the spatial readout or playback speed $v_o$. In general, these relationships hold for any recording and playback process involving a temporal-spatial-temporal sequence.

There are certain situations where it is desirable to read out or play back the recorded signal at a faster rate than the rate at which it was recorded. This is especially the case with people who have highly developed auditory senses and corresponding speed of comprehension, such as blind people, who prefer faster playback of recordings. For these people, it is preferable to have the output or playback speed $v_o$ set higher than the input or recording speed and thus shorten playback duration as compared to the recording duration. Yet, the ears of these people are attuned to a normal pitch, so that the pitch of the playback signal should be maintained at substantially the original pitch of the recorded signal or adjusted to a pitch satisfactory to them.

These seemingly opposite requirements have been resolved according to prior art by providing rather complex mechanical means, such as, a plurality of moving pick-up or read-out units, which set the overall read-out rate $v_o$ differently from the write-in rate $v_i$, as measured by dividing the overall length of the recording by its playback time, while the reading speed of segments of the reproduced recording occurs at the recording speed $v_i$. It has been found, however, that such mechanical means have a number of shortcomings. For example, the pick-up heads tend to vary in terms of performance and they tend to introduce varying degrees of high level noise in the signals being read out.

Also, while such known apparatus was designed to be capable of modifying either the pitch or read out rate, it cannot do both simultaneously. In addition, mechanical means often tend to limit the range and speech of the expansion and compression, introduce maintenance problems and subject the audio or speech signal to distortion as it is compressed.

Then there are certain other situations where the pitch of the speech signal increases to a degree which impairs the quality of the communication, for example, in the case of a real time communication system between a person aboard ship and a deep sea diver. The speech signal of the diver becomes difficult to comprehend, due to the effect of the atmosphere of oxygen and helium which divers often use. Under these conditions the pitch of the diver's voice increases rather sharply and is difficult to understand.

One object of the invention resides in the provision of signal compression-expansion apparatus which overcomes the aforementioned shortcomings of the prior art.

Another object of the invention resides in the provision of a signal compression-expansion apparatus wherein noise and distortion have been maintained at a minimum.

Still another object of the invention resides in the provision of a versatile signal compressor-expander wherein both the degree of compression and pitch can be controlled simultaneously or in succession and which is adapted for use with audio as well as other frequencies.

Still another object of the invention resides in the provision of a real time apparatus, which can decrease or increase the pitch of the audio signals and which can be used in a communication system to overcome numerous problems, such as the so-called "helium speech".

These and other objects of the invention are achieved by providing means for discarding certain segments of the signal being read into the apparatus herein described and assembling undiscarded portions, or repeating certain portions of the input signals before they are read out so that the pitch of the signal finally reproduced may be either preserved or modified as required.

Another feature of the invention resides in the provision of means for converting the signal into samples and means for storing them temporarily and reading them out while discarding or repeating groups of said samples, which represent portions of the input signal and combining the retained samples to reproduce the information contained in the input signal.

A further feature of the invention resides in the provision of means for interlacing the write-in and read-out operations while giving the write-in or read-out operation priority, depending upon the requirements.

Still another object of the invention resides in the provision for comparing the internal write-in and read-out rates to generate a control signal or signals for the adaptive modification of the processing logic.

Still another feature of the invention resides in the provision of means for varying the compression and expansion.

A still further feature of the invention resides in the provision of means for varying the duration of the segments into which the sampled signal is blocked which may be deterministic or random.

An additional feature of the invention resides in the provision of means for varying the pitch of the signal being read out.

A further feature of the invention resides in the provision of means for selecting optional logical organizations of the manner in which the write-in and read-out processes relate, whereby said processes can be optimized for specific conditions of compression and expansion and/or variation of pitch.

The foregoing and other objects and features of the invention will be more clearly understood from the following description and accompanying drawings.

Figure 4:
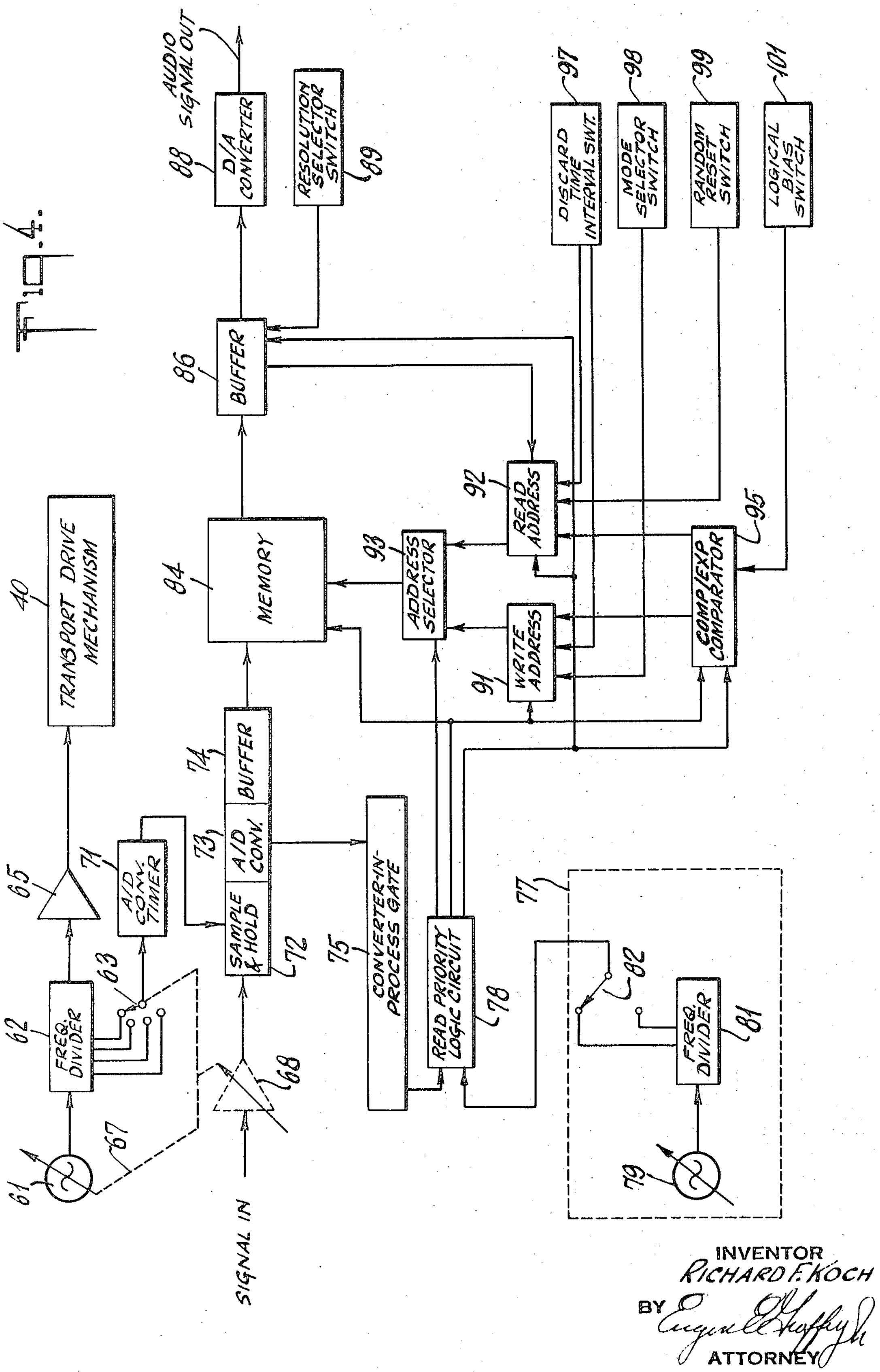
FIG. 4 is a block diagram of a specific form of apparatus according to the present invention.

FIGS. 5a, 5b, and 6–8 illustrate details and the operation of various portions of the apparatus shown in FIG. 4.

Figure 9:
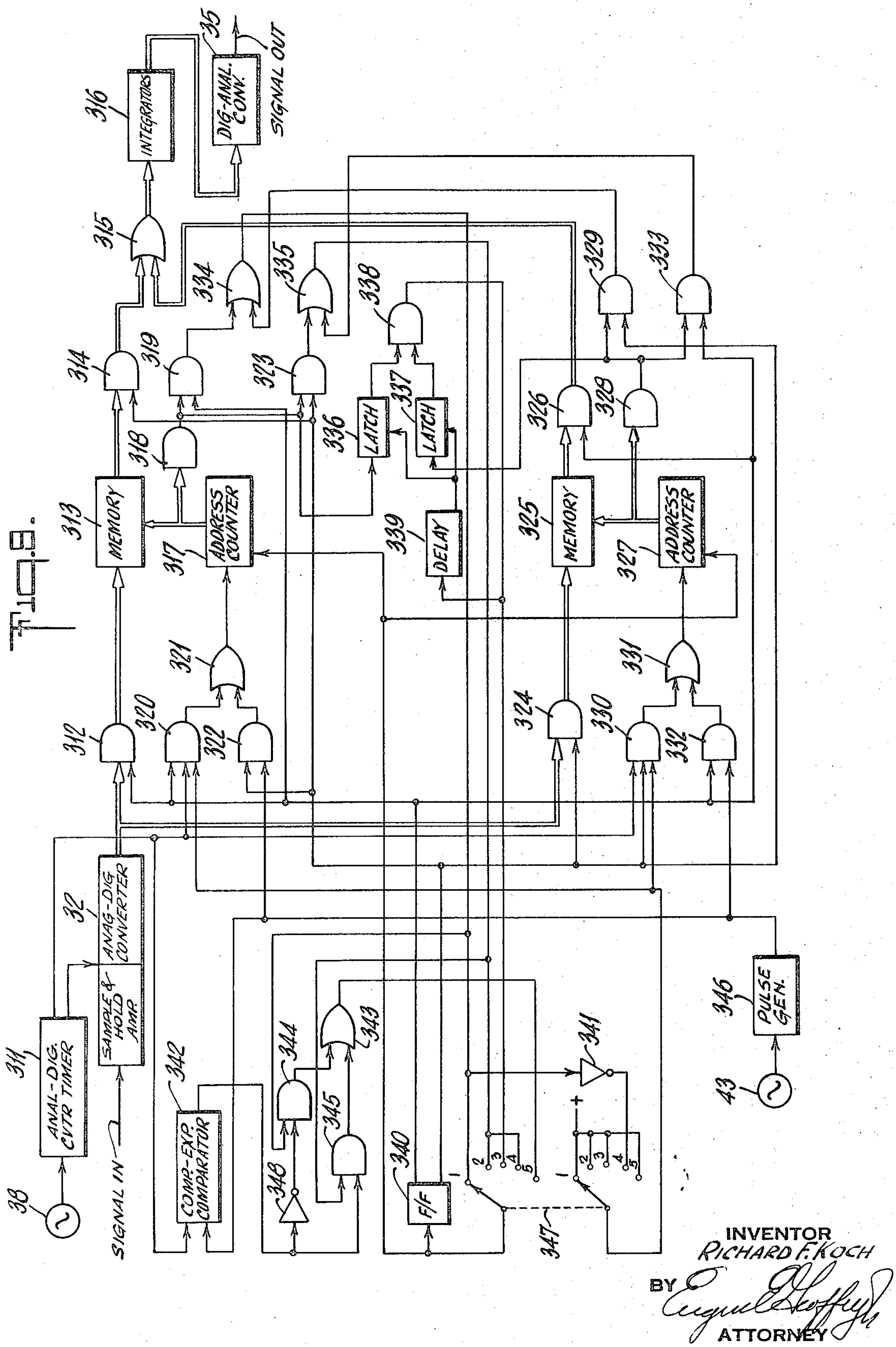
Figure 10:
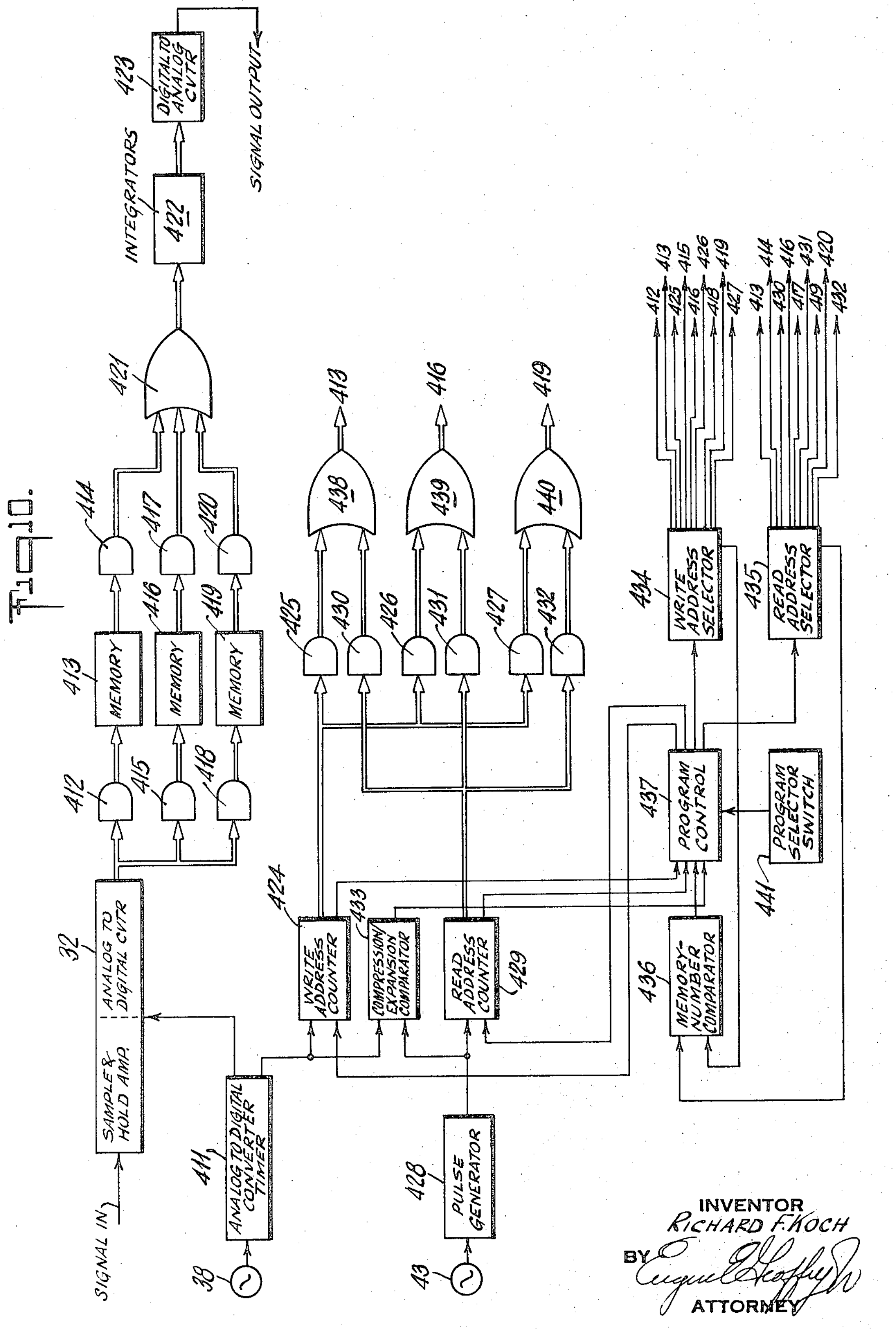

FIGS. 9 and 10 illustrate other embodiments of the apparatus for compressing and expanding signals and modifying the pitch thereof.

Figure 1A:
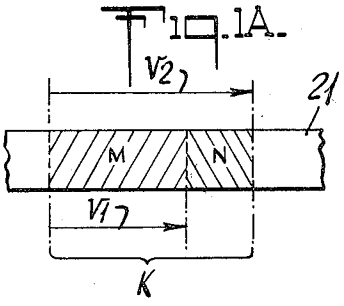
FIGS. 1A and 1B and 2A and 2B are schematic illustrations of the signal compression and expansion processes performed by the apparatus in accordance with the invention.
Figure 2A:
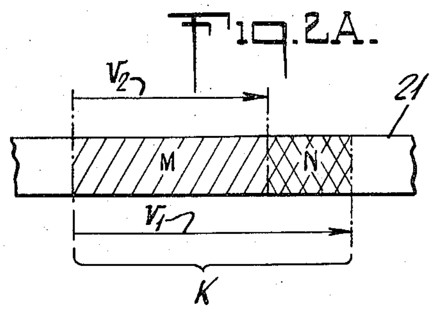
Figure 1B:
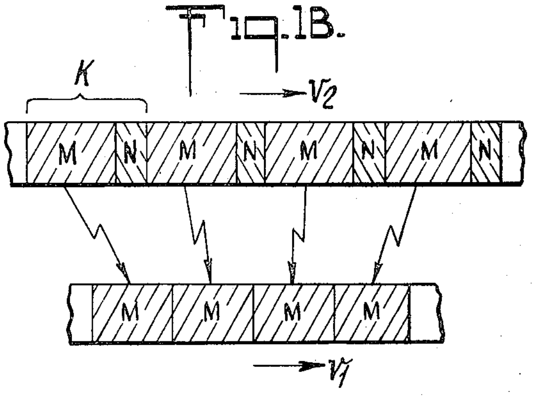
Figure 2B:
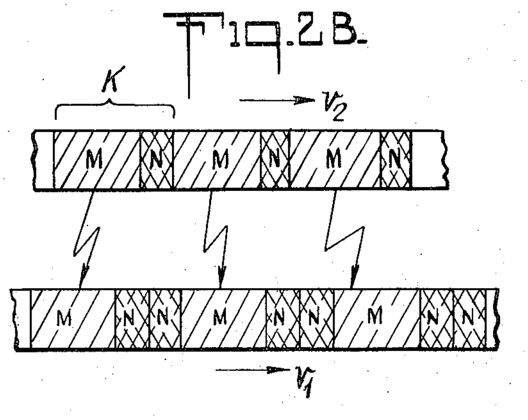

Referring to the drawings, FIGS. 1A, 1B, 2A and 2B illustrate schematically how signals recorded on a medium 21 or other medium can be compressed or expanded. As shown in FIGS. 1A and 1B, during compression, a portion M of each of the successive segments K of the record is read-out or played back at a speed $v_1$ which is equal to the rate at which it was originally recorded, but is slower than the rate $v_2$ at which the record is being transported for playback, while a portion N or each segment is discarded. In expansion, as shown in FIGS. 2A and 2B, an entire segment K is read out at a faster rate $v_1$, after which a portion N of the segment just read is repeated at the faster rate $v_1$ producing an overall retardation of the faster read-out process to keep in step with the slower rate $v_2$ at which the medium advances. The foregoing can be expressed in the following algebraic relationship:

Input signal:
- temporal frequency $= f_1$ cycles per second

Recorded signal:
- spatial frequency $= f_1/v_1$ cycles per inch
- where $v_1$ = speed of recording medium in recorder Signal reproduced within apparatus:
- temporal frequency $= (f_1/v_1)\ v_2$ cycles per second
- where $v_2$ = speed of recording medium in reproducer Stored signal:
- spatial frequency $= (f_1 v_2/v_1 v_3)$ cycles per inch (or cycles per storage location, or other convenient representation)
- where $v_3$ = speed of entry into storage Retrieved Signal:
- temporal frequency $= (f_1 v_2/v_1 v_3)\ v_4$ cycles per second
- where $v_4$ = speed of retrieval from storage Output signal:

let output signal = retrieved signal
and also let
$v_4/v_3 = v_1/v_2$;
since $v_1$ and $v_2$ are known, this can readily be accomplished, e.g., by holding $v_3$ fixed and adjusting variable $v_4$ appropriately; then the temporal output frequency is:
$f_2 = f_1(v_2 v_4/v_1 v_3) = f_1\ (v_2 v_1/v_1 v_2) = f_1$
Thus, the temporal frequency of the audible signal is restored.

Figure 3:
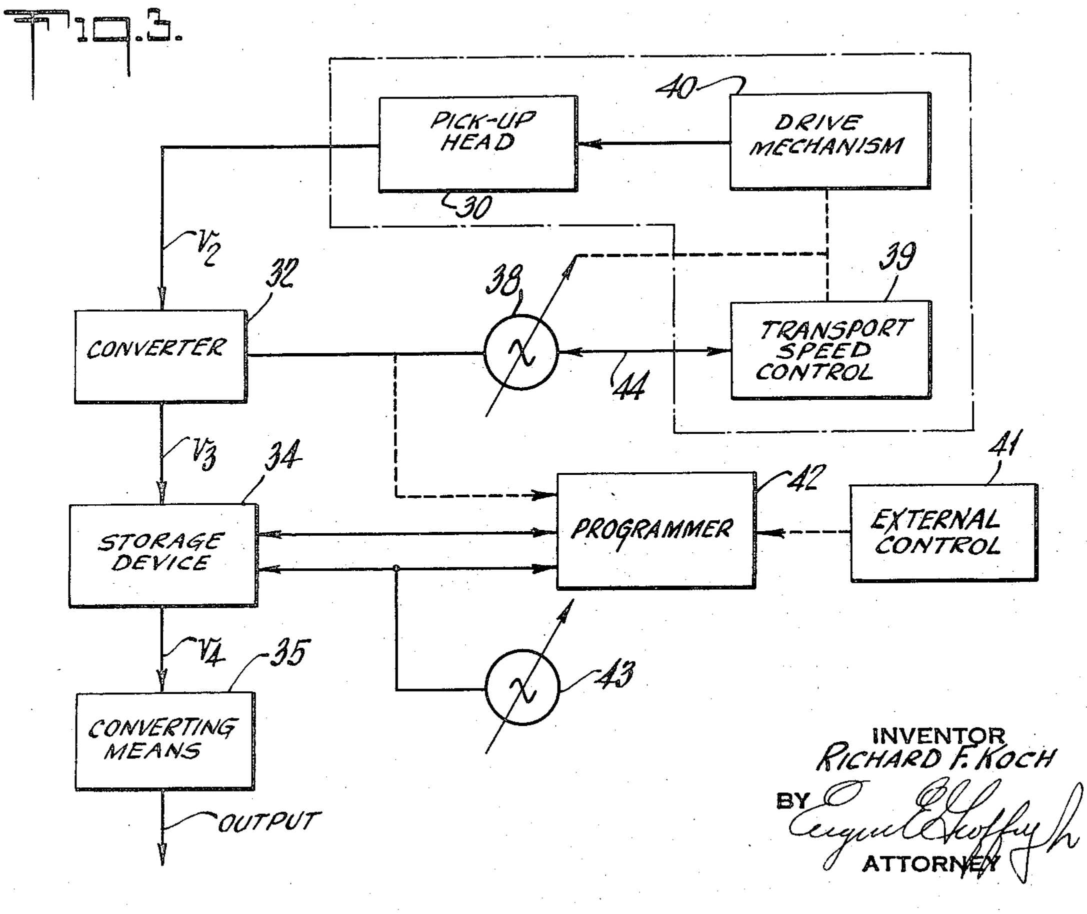
FIG. 3 is a block diagram of one embodiment of apparatus for compressing and expanding signals and modifying the pitch thereof.

The signal process described in connection with FIGS. 1A, 1B, 2A and 2B can be implemented with an apparatus schematically illustrated in block diagram form as shown in FIG. 3. In this embodiment a pick-up head 30 reproduces the audio signal (which was originally recorded at speed $v_1$) at speed $v_2$, and applies the signal to suitable converting means 32. The converter 32, generally controlled by the oscillator 38, transfers the converted signal to a suitable storage device 34 at the speed $v_3$. Subsequently, the signal is read out of the storage device 34 at a rate $v_4$ and is applied to a suitable converting means 35 to provide the audio signal output. In this process $v_3$ and $v_4$ are chosen in a manner that will restore the original temporal frequency $f_1$ or some other frequency as desired.

The converting means 32 may include suitable means for sampling its input at regular intervals to provide a discretely sampled amplitude history of the input signal for retention in the storage device 34. The sampling rate is preferably governed by a timing source in the form of a variable-frequency oscillator 38 and the sampling rate should preferably be at least twice that of the highest frequency component of the input. As a practical matter, a low-pass filter (not shown) may be inserted between the input and the converter 32, if it is desirable to eliminate the high-frequency components. It is also desirable, but not essential, that the frequency of oscillator 38, and thus the speed $v_3$ of the signal fed to the storage device 34 be proportional to the speed of the playback transport, $v_2$. If the proportionality factor is $m_1$, then $$v_3 = m_1 v_2$$

For all operating conditions, velocity $v_1$ may generally be considered as fixed, since it is outside the control of the means herein described. In practice, however, the flexibility introduced by the many variables inherent in the apparatus to be described permits compensation for any value of $v_1$ that may be chosen. Accordingly, it is possible to choose $$v_4 = m_1 v_1$$

From this and the temporal output frequency $f_2$ relationship given above, $$f_2 = f_1(v_2 v_4/v_1 v_3) = f_1\ (v_2 m_1 v_1/v_1 m_1 v_2) = f_1$$

It is evident that $v_4$ may be held constant by an appropriate choice of the variable $v_3$. This relationship can be maintained by coordinating the frequency of the input sample oscillator 38 with the transport speed control mechanism 39 which controls a drive mechanism 40 which produces relative motion between the recording medium, carrying the signal to be reproduced, and the pick-up head 30. This coordination can be obtained in many ways, including:

a. Incorporation of an electronic tachometer into the drive mechanism 40 with means to compare the output of the tachometer with the frequency of oscillator 38 and thereby, through the speed control mechanism 39, control the speed of the drive mechanism 40 and coordinate it with the oscillator 38;

b. Incorporation of an electronic tachometer into the drive mechanism 40 with the output of the tachometer serving to provide the sampling frequency for the converter 32. In this case, the tachometer serves functionally as the oscillator 38;

c. Incorporation of an electronic tachometer into the drive mechanism 40 and mechanical coupling of the tuner of oscillator 38 with the transport speed control mechanism 39. With an electronic connection between the tachometer and the oscillator 38, the oscillator 38 will be caused to maintain an exact frequency relationship with the transport speed control 39.

d. Provision of a control signal, fixed in frequency at the time of recording and carried on a separate track or by multiplexing, the said control signal to govern the sampling rate of the converter 32.

e. Provision of a low-frequency source, wherein the frequency is maintained at a fixed ratio to the variable-frequency oscillator 38 and means for amplifying the output of said low-frequency source to provide driving power for a frequency-sensitive motor in the drive mechanism 40 to coordinate the transport speed with the frequency of oscillator 38.

The connection 44 between the input sample oscillator 38 and the speed control mechanism 39 may be arranged so that either one may govern the other and the interconnection between them may be either electronic or mechanical or both. Alternatively, the control mechanism 39 may be adapted to operate separately from the oscillator 38.

It is to be understood that, in FIG. 3, transport speed control 39, drive mechanism 40, and a record head complementary to pick-up head 30, may be coordinated with oscillator 43, altogether complementary to the coordination with oscillator 38 described above. This may be desirable particularly when a real-time input to converter 32, as from a microphone, is to be recorded in such a manner that the recording, when played back at a rate $v_1$, will be compressed or expanded.

Storage means 34 may consist of a register or registers capable of temporarily storing analog or digital samples derived by the sampling means 32. If the samples are in digital form, the sampling means 32 would include a suitable analog-to-digital converter. Examples of the storage means 34 include, but are not limited to, magnetic cores or a "bucket-brigade" line of semiconductor memories described in the IEEE Journal of Solid State Circuits, June 1969, pages 131–136. Just as various storage means are suitable, so are various organizations of the data in the memory 34 in accordance with known technology. Thus, for example, digital words may be stored in serial bit form, in parallel, or in serial-parallel.

The flexibility inherent in an electronic system makes it possible to control the length of the samples being discarded in compression and repeated in expansion or their average lengths, or the bounds on their lengths, etc. Changes can be made in a time comparable to the length of time that individual segments reside in storage means 34, and while the apparatus is operating. This capability has great value in optimizing the processing of the signal in accordance with its internal characteristics by manual or automatic control, or a combination thereof, in the performance of research, etc. A command structure for this purpose such as a register-length programmer 42 may be utilized.

The register-length programmer 42 may be controlled by the input sample oscillator 38, read oscillator 43, or external control means 41 such as switches or a computer, or combinations thereof. The programmer 42 may also be controlled in a quasi-random manner by signal samples from the signal storage 34. For example, the use of a sampled-data system may call for digital logic to control the said system as a matter of convenience, although not of necessity. In such a case the programmer 42 may utilize logic devices such as gates, flip-flops, etc. The output of the storage device 34 may be in an analog or digital form. If the former, it may easily be converted to digital form for use by the programmer 42 and for this purpose such conversion need not be made with careful attention to the accurate rendition of the analog data but only with consideration that the digital words be changeable. The digital words can then be used as commands to the programmer 42 to set the lengths of the processed segments, portions of which are discarded in compression or repeated in expansion as illustrated in FIGS. 1 and 2. Said commands may be subject, if desired, to constraints imposed by one or more of the other means which are capable of controlling programmer 42. Among other possibilities, a digital word may be selected directly or indirectly from the storage device 34 at the end of each segment and used to determine the length of the next segment. Alternatively, separate analog or digital noise sources may be used to randomize segment length.

Specific examples of the apparatus illustrative of the foregoing general concepts will now be described.

Figure 5A:
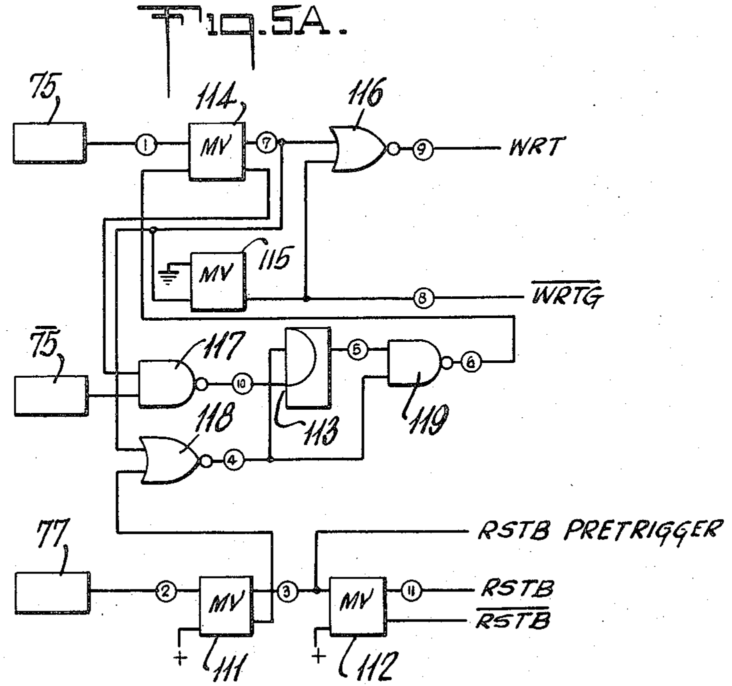
Figure 5B:
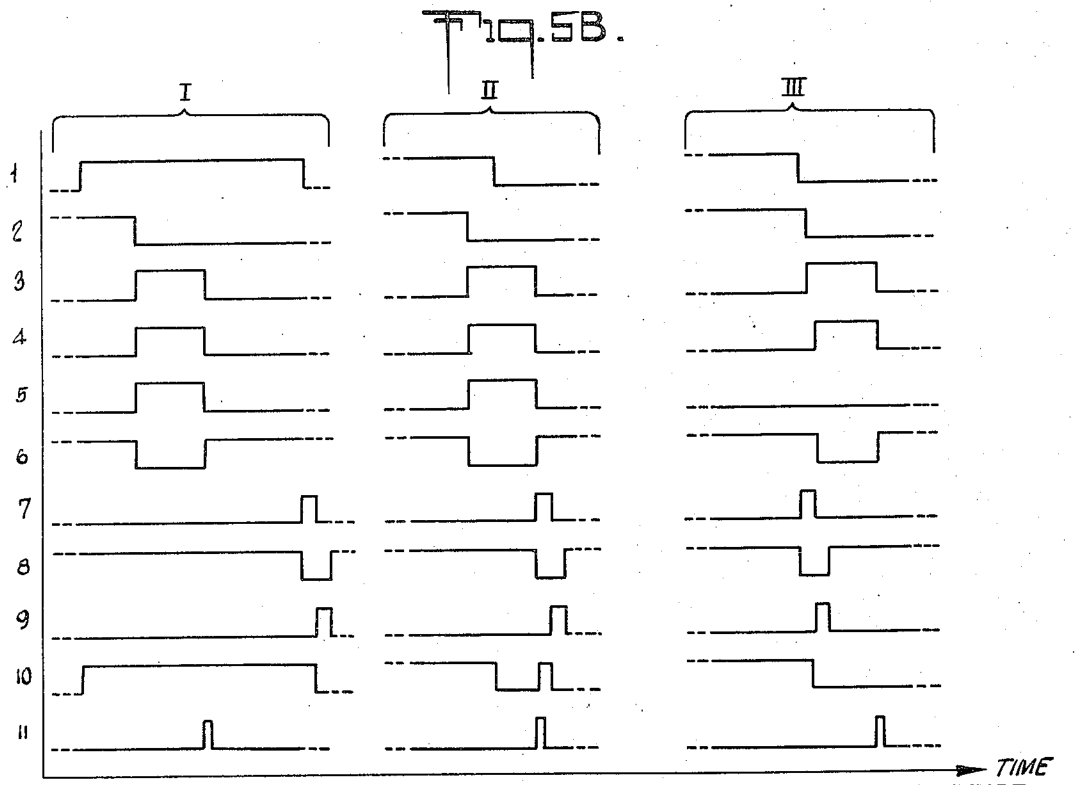
Figure 6:
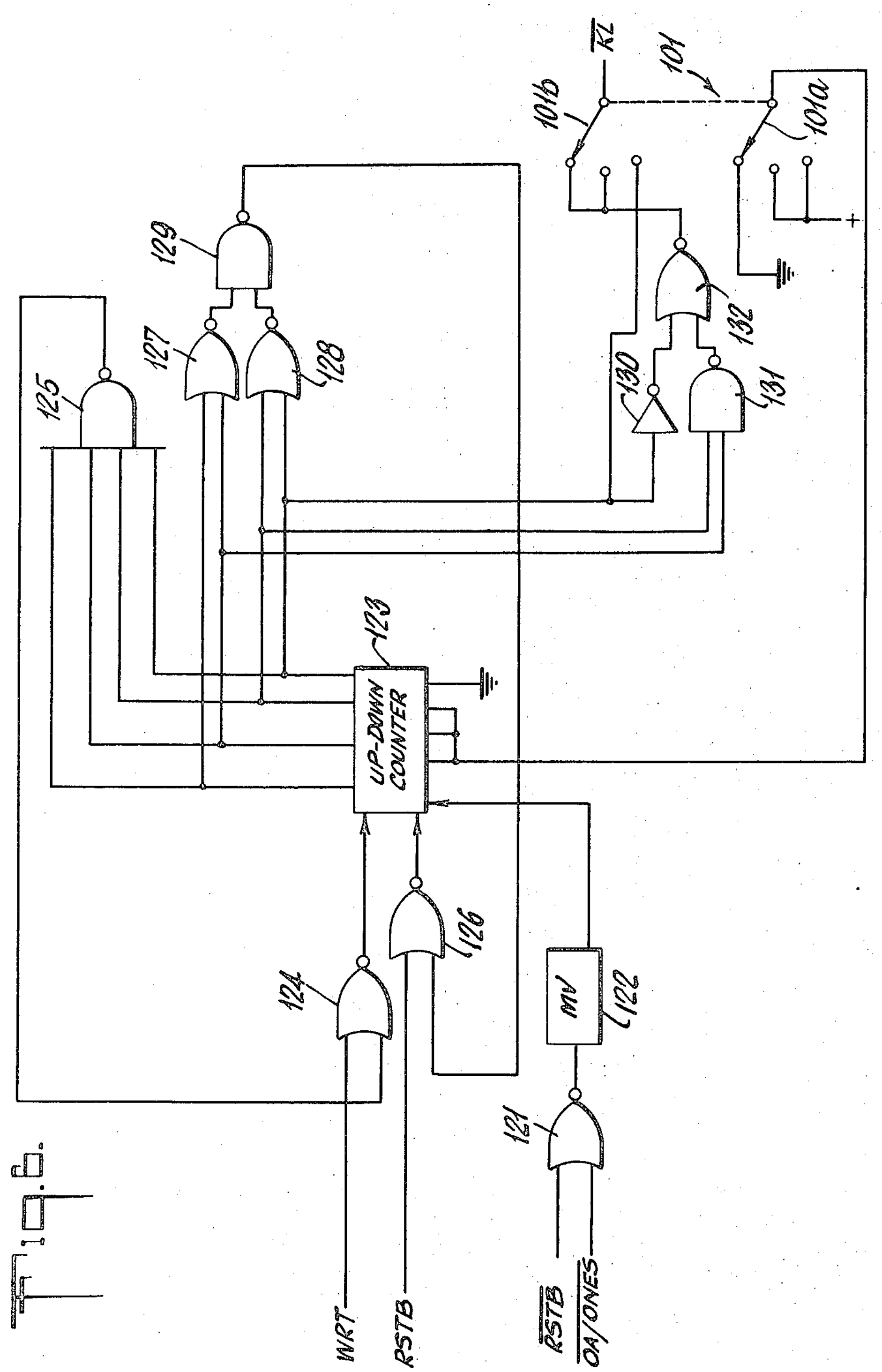
Figure 7:
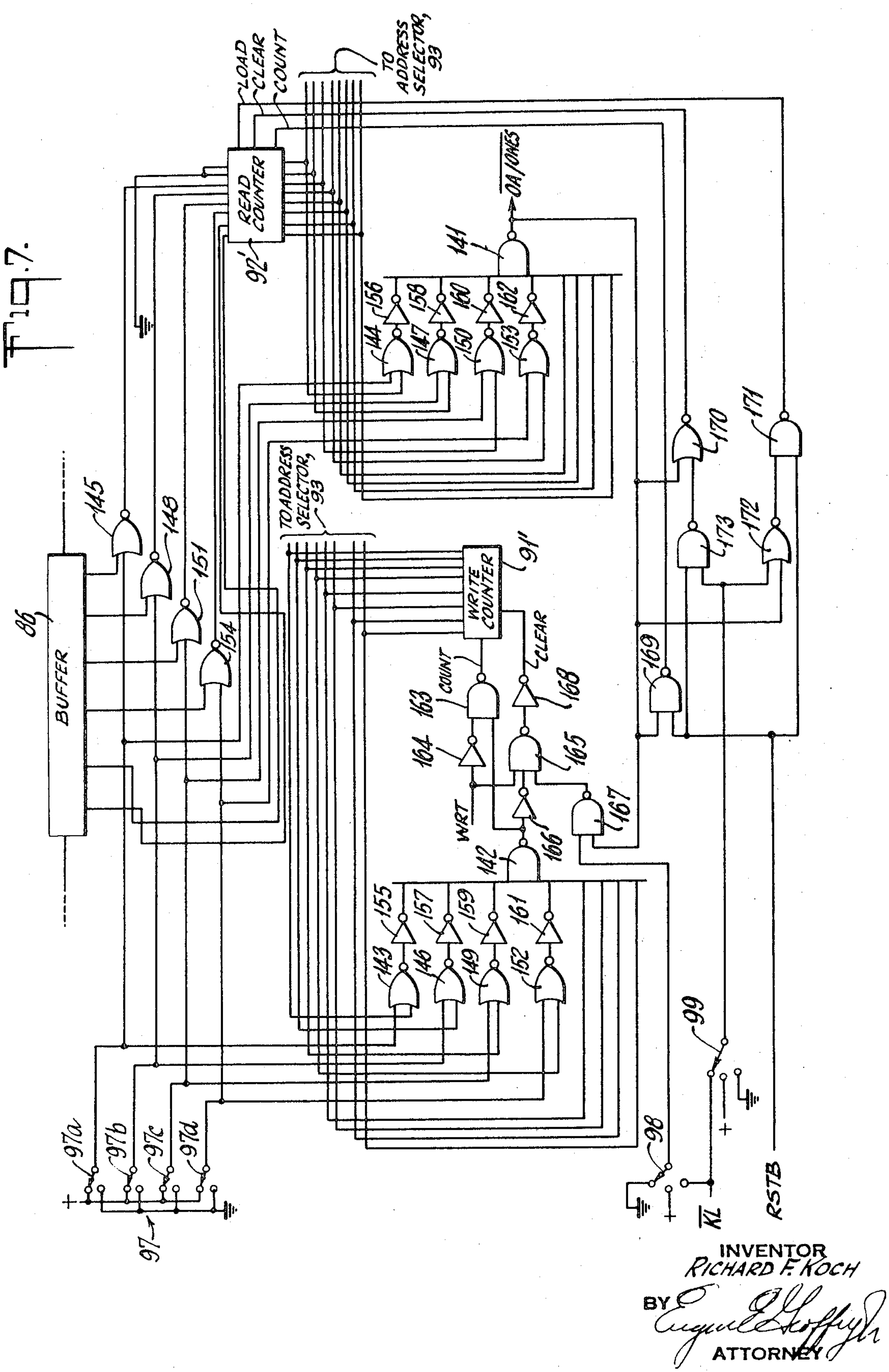
Figure 8:
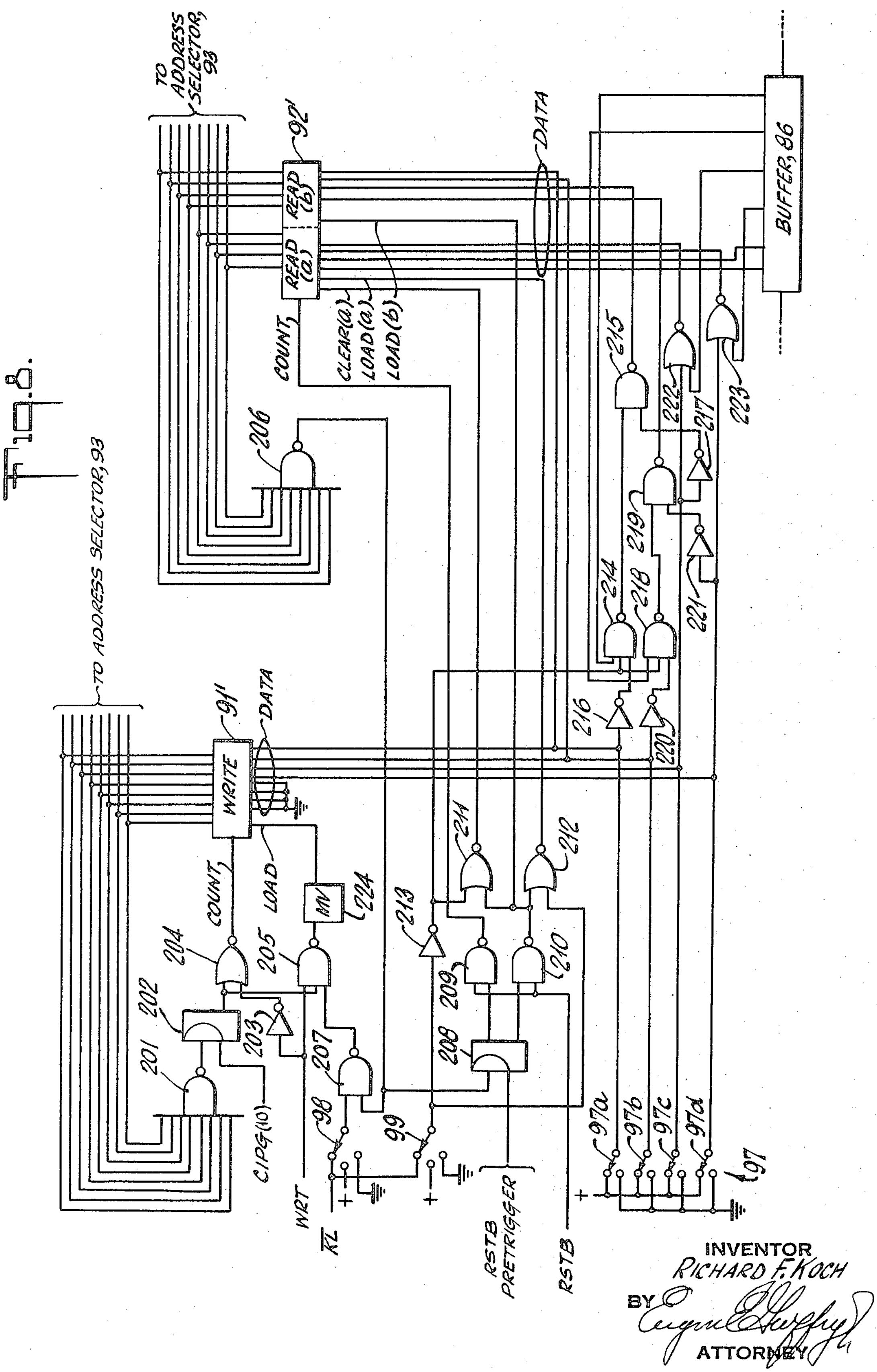

Referring to the drawings, FIGS. 4–8 illustrate one embodiment of electronic apparatus in accordance with the invention for treating audio frequencies though the apparatus is not limited to that frequency range; and, of these figures, FIGS. 7 and 8 illustrate alternatives for a portion of the said embodiment. For a particular apparatus represented in FIG. 4, the maximum length of sample segment K indicated in FIGS. 1 and 2 is 26.6 milliseconds, normalized to recording velocity $v_1$. The apparatus is also provided with a switching means to permit an operator to shorten the sample segment K in a fixed or random manner while the apparatus is in operation. The apparatus is designed to cover substantially the range of audio frequencies specified by the Federal Communications Commission for AM broadcast stations generally, and more particularly designed to cover audio frequencies up to 4,800 Hz. In order to obtain a good signal-to-quantizing noise ratio an 8-bit representation of the analog signal is used. It is to be understood, however, that instead of representing each sample as an independent entity other techniques such as differential pulse code modulation or delta modulation can be used.

Now, more specifically referring to FIG. 4, the writing clock pulses for storing a representation of the input signal in the temporary memory 84 are governed by an oscillator 61, the output of which is applied directly or indirectly to converting means 73. Thus, the output of the oscillator 61 may be directly applied to a timer 71 or through a frequency divider 62 as shown so that the timing frequency varies from about 1,900 Hz to about 50,000 Hz. The frequency divider may be designed to provide frequency division by a factor of 1, 2, 4, or 8. A power amplifier 65, used in conjunction with the divider 63, provides variable frequency power for the transport drive mechanism 40. The minimum sampling rate for a sampled data system is set to be twice the highest frequency of interest in the sampled data. Thus, if the input signal is to be neither compressed nor expanded in time, a sampling frequency of 9,600 Hz is used for the maximum frequency of 4,800 Hz. The write oscillator 61 has a range of approximately 1,900 Hz to 50,000 Hz and, therefore, theoretically affords capabilities of compression by more than a factor of 5 or expansion by the same. Mechanical connections 67 are optionally provided between the oscillator 61 and switch 63 on one hand, and an optional input equalizer-amplifier 68 or an output equalizer amplifier on the other, to compensate for the effect of transport-speed variations on the frequency response.

The output of the switch 63 is applied to an analog-digital (A/D) converter timing circuit 71 which consists of conventional pulse generation and delay circuits. The output of the timing circuit 71 drives the combination of the sample-and-hold circuit 72 and the analog-to-digital converter 73. The sample and hold circuit 72 also receives the input audio signal either directly or optionally through the equalizer-amplfier 68 that may provide a combination of equalization with gain or attenuation as required. The converter 73 outputs are samples of the input from the signal source, quantized as 8-bit words. It also applies an output to the converter-in-process gate 75 which produces a gating signal indicating whether the converter is processing a new sample or is resting between samples. Gate 75 and a conventional variable clock source 77 operate a read priority logic circuit 78.

Read clock pulses are derived from a series circuit comprising a read oscillator 79, a frequency divider 81, and a switch 82, which provides an output having a frequency range of about 3.8 to 25 kHz so as to provide pitch adjustment upward or downward over about two-and-a-half octaves altogether.

The degree of compression or expansion and the change in pitch, if any, of the signal processed by this apparatus is determined by the write and read oscillator rates, respectively. That is, in terms of the algebraic derivation above, these rates are $v_3$ and $v_4$. Therefore, it is desirable that the input be sampled at a steady rate, as determined by the frequency of the write oscillator 61, divider 62, and switch 63. Also, the output is synthesized from samples read out of the memory at a steady rate as determined by the read oscillator 79, frequency divider 81, and switch 82, to avoid the imposition of spurious frequency modulation upon the signal. Because the write oscillator 61 and the read oscillator 79 are in general not synchronized, special means are provided to attain these ends, namely, a read priority logic circuit 78 and a buffer 74.

In the apparatus of FIG. 4 the converter 73 is designed to provide a conversion time period under 10 microseconds. Thus, even at the maximum input sampling rate of 50 kHz, the converter 73 is at rest over 50 percent of the time. During the rest time, the 8-bit word representing the sample resides in the output buffer 74 connected to the converter 73. The buffer 74 is designed to hold only one word at a time and, therefore, each sample word must be written into the memory 84 before the converter begins to process the next word; otherwise, the earlier word will be lost. This transfer is effected in less than one microsecond for a typical memory device. Thus, considerable leeway is available for writing. In the extreme case of maximum compression, conservatively 10 microseconds are available for a one-microsecond operation.

Words are read out of the memory 84 at a steady rate determined by the read oscillator 79. An output buffer 86 is used to transfer the output words to a digital-to-analog converter 88, which generates the analog output signal. The buffer 86 is required because the memory 84, as selected for the embodiment of FIG. 4, presents undesired signals on its output lines during the time when an input is being written. Accordingly, the buffer 86 is commanded to accept read-out signals from the desired locations in memory 84, between write-in signals, in synchronization with the oscillator 79. The output of buffer 86 is normally applied directly and without further clocking to the digital-to-analog converter 88. However, an optional resolution selector switch 89 may be provided so that one, two, three or four least significant bits in the words read out of memory may be suppressed before the buffer 86 applies its output to the converter 88.

While the foregoing description implies the use of a parallel organization of the digital words, such organization may be serial or serial-parallel.

The read priority logic circuit 78 coordinates the writing and the reading operations as follows. The logic circuit 78 continuously compares the pulses of the converter-in-process gate 75 and the read clock pulses from the read oscillator source 77. If the gate 75 indicates the availability of a sampled word at a time which will not interfere with reading, as signalled by the latter source 77, writing functions are immediately initiated. However, if interference is evidenced, the writing functions are delayed in favor of reading and then performed later, but well within the ten microsecond minimum time stated above. In this manner the independent synchronous requirements for sampling and synthesizing are satisfied and the writing and reading functions are suitably interlaced.

The buffer 86 is in a complementary position to the buffer 74 with respect to the read priority logic circuit 78. That is, the transfer of signals from butter 86 to the converter 88 may be clocked at a synchronous rate, with the input to buffer 86 being subjected to priority in favor of writing into the memory 84. In this manner, a write priority logic could be utilized to satisfy the overall system requirements in a manner complementary to the existing read priority logic circuit 78.

More specifically, the output of logic circuit 78 is designed to govern a variety of functions in connection with the write and read operations. Among these functions are:

a. Clock the write and read address networks 91 and 92;

b. Switch address selector gates 93 when the memory 84 has only one address structure and this should be instructed by the write or read location information as appropriate;

c. Select a memory mode for writing or reading;

d. Strobe the output buffer 86 to accept read out from memory 84; and e. Clock compression/expansion comparator 95.

FIG. 5A illustrates the details of the read priority logic circuit 78. It is driven by the converter-in-process gate (CIPG) 75, its complement $\overline{75}$, and the read clock 77. For convenience the blocks 75 and $\overline{75}$ are intended to represent the gating signal and its complement as produced by the converter-in-process gate 75. In this figure, as in others showing the details of logical mechanization, positive logic is used, that is, a positive or high level is 1, and a ground or low level is 0. The basic principle of the read priority logic is that if it appears that a "write" signal be commanded at any time while "read" functions are in process, the write signal must be delayed until the read function is completed. At other times write and read processes may proceed independently. On the basis of known durations for the write and read functions, a guard-time pulse is generated by a monostable multivibrator (MV) 111. The guard time relates writing, indicated by the state of the gate 75, and reading as follows:

1. As shown in FIG. 5B, Section I, if the CIPG 75 makes a 1-0 transition (indicating that the write operation may start) while MV 111 is at rest, the write command proceeds and write pulse 9 is immediately generated because there is no interference;
2. As shown in FIG. 5B, Section II, if CIPG 75 makes a 1-0 transition while MV 111 is active, i.e., during the guard time, the write operation is delayed until the end of the MV 111 pulse;
3. The read functions occur at the trailing edge of the MV 111 pulse 3; therefore, even if the write operation is commanded at the trailing edge of the MV 111, natural propagation delays in the write logical elements insure that the read operation is concluded before the write operation begins. The trailing edge of the positive pulse 3 from the MV 111 triggers a multivibrator MV 112 which generates a read pulse RSTB and its complement, $\overline{\text{RSTB}}$ (see FIG. 5B, pulse 11) which are very short and actuate the read functions.

The priority logic is accomplished by a latch circuit 113. As shown in FIG. 5B, Section II, if CIPG 75 makes a 1-0 transition while MV 111 is active, the latch 113 is set, thereby providing a memory for the command to write but inhibiting MV 114 and MV 115 while MV 111 remains active. Then, at the trailing edge of the MV 111 output 3, MV 114 is turned on, and the leading edge of its output 7 turns on MV 115. As shown in FIG. 5B, Section III, if the CIPG 75 makes a 1-0 transition while the MV 111 is at rest, the latch 113 is not necessarily activated; MV 114 is turned on immediately by the transition and immediately turns on the MV 115.

MV 114, MV 115 and NOR gate 116 generate pulses WRT and $\overline{\text{WRTG}}$. More specifically, MV 114 generates a short pulse 7 and the MV 115 generates a long pulse 8. Thus, the output 9 of the NOR gate 116 is a pulse having a width which is the difference between the widths of the pulses from MV 114 and MV 115, and having a leading edge which is delayed relative to the leading edge of the pulse 7 from MV 114 by the width of that pulse. Gates 117, 118 and 119 interconnect the write and read signals as required for the various timing operations indicated by the timing wave forms shown in FIG. 5B.

The address networks 91 and 92 each handle 8-bit digital words. Each has associated with it an 8-bit NAND gate as shown in FIGS. 7 and 8. These gates, together with the discard interval switches 97, determine normalized fixed durations of the discard time interval. In addition, subject to the operator's choice, these gates in conjunction with mode selector switch 98 and information from comparator 95, produce a variety of patterns to effectuate the simplified patterns of compression and expansion shown in FIGS. 1 and 2. As an optional feature a random reset switch 99 may be provided as a means for imposing a random reduction in the discard time interval from the maximum selected by the discard time interval switch 97.

At the beginning of a write or read operation, the appropriate address is selected by the address selector gates 93 of conventional structure and presented to memory 84. After a suitable time for the address decoders in the memory 84 to settle, a write command is given or the buffer output is strobed to read, as appropriate. The memory 84 may be arranged so that it is normally ready to be read out and requires an affirmative command to place it in the write mode. The output buffer 86 may be of a conventional structure which is usually "off" to read-out from the memory 84. Consequently, an affirmative command to the buffer 86 is required for it to accept each word read out of the memory 84. At the end of the write or read command the address network 91 or 92 respectively, is, in general, advanced one count. The time between the write or read operations is much longer than the settling times of the related address networks 91 and 92. Exceptions to advancing the address networks include the following:

a. When a counter of the address network reaches a maximum value determined by the operating mode and the maximum discard time interval, the next count is an initial value (not necessarily zero);

b. In compression the counter of the write address network 91 may pause at its maximum value until the more slowly clocked counter of the read address network 92 catches up to this value after which they return to their initial values each in response to its own clock pulse;

c. The read address counter may be reset to a midrange value or to zero following a count which brings it into numerical coincidence with the write address counter, and d. The counter resetting may be commanded in accordance with the exact value of the compression or expansion factor, within the restrictions of digital computation of the ratio of the writing to the reading rate.

Variability in resetting the address networks provides means for optimizing operating modes for particular operating ratios of compression or expansion, of pitch modification, and compensation for input signal characteristics. This variability is one of the important aspects of the present invention.

Of significance in the compression-expansion comparator 95 is the provision of a counter capable of counting up or down. Counting up is performed at the clock rate of write address network 91 while counting down is performed at the clock rate of read address network 92. The said up-down counter tends to count to a maximum value in compression and to a minimum value in expansion. It is to be understood that the up and down directions of counting and their associated operations can readily be interchanged by simple and consistent modifications of the rules under which the said up-down counter is used here. Logical bias switch 101 provides means whereby the operator can arbitrarily select the initial value of the counter and the critical count distinguishing compression and expansion. Thus, this switch 101 introduces a selectable bias into the internal process. In certain operating modes, differences exist between resetting the write and read address counters 91 and 92 in compression and expansion.

If an operator is required to process a large amount of material, some to be compressed and some to be expanded, or if a particular material is to be subjected in part to compression and in part to expansion, means may be provided to automatically distinguish between compression and expansion and thus ease the operator's task. The automation is especially beneficial to casual users, such as students or handicapped persons such as the blind.

FIG. 6 is a detailed illustration of the compression expansion comparator 95 of FIG. 4. The comparator operates by making a greater than or less than comparison between the number of write and read clock pulses WRT and RSTB generated between the time that the read address network or counter 92 is reset and the time that its associated NAND gate indicates all ones ($\overline{\text{OA/ONES}}$); i.e., when the NAND gate indicates that a count corresponding to the selected value of normalized discard interval has been reached by the counter 92 and its associated NAND gate as shown in detail in FIG. 7 or FIG. 8. To begin the process, the complements of OA/ONES and RSTB, namely, $\overline{\text{OA/ONES}}$ and $\overline{\text{RSTB}}$ are gated together in the NOR gate 121 and the trailing edge of the output of the NOR gate 121 triggers MV 122. In turn, the trailing edge of the pulse from the MV 122 loads the up-down counter 123. The MV 122 delays loading of the counter 123 until after the read address network or counter 92 has been reset, since the manner in which the address network or counter 92 resets may be subjected to the state of the counter 123, at the discretion of the operator of the equipment.

The counter 123 is so designed that it can be loaded to decimal 0 or decimal 7 in accordance with the setting of logical bias switch 101, at the operator's discretion. This is one way in which the operator may choose to modify the compression or expansion modes. The biasing may be advantageous in some cases of small compression where the quality of signal processing may be enhanced by invoking certain rules for resetting the address counters 91 and 92 that are more usually associated with expansion. After the counter 123 is loaded, it is commanded to count up at each write time by the write pulse WRT and down at each read time by the read pulse RSTB, until it accumulates all ones or all zeros respectively. When the counter reaches all ones, a succeeding up clock pulse will cause it to recycle, and conversely. To prevent such undesired recycling, gates 124 through 129, inclusive, are provided. However, these gates permit continued up-down cycling in response to the WRT and RSTB pulses, merely placing bounds of all ones and all zeros on the range.

The counter 123 indicates compression or expansion via switch section 101b of the logical bias switch 101. In one position of the switch 101, compression is indicated by a decimal count of 8, i.e., the most significant bit of counter 123 is binary 1. In the other positions of the switch 101, the decision is biased to require decimal 14 or 15. It is desirable to provide the option of 14 or 15 because the interlacing of the WRT and RSTB pulses together with the bounding of the up counting in the counter 123 at all ones, may produce a count of decimal 14 at the decision time even for a high ratio of compression. Elements 130, 131 and 132, operating together recognize the counts of 14 or 15. Thus, the switch 101 makes three criteria available for indicating the fact that compression is taking place — an excess of one write clock pulse over the read clock pulses, an excess of eight, or an excess of at least 14. For convenience, the logical level which is the output of comparator 95 is denoted $\overline{\text{KL}}$ herein. If $\overline{\text{KL}}$ is a logical 1 (that is, high, or plus), it is taken to signify compression.

It is to be understood that the principles associated with the counter 123 and the switch 101 are subject to many variations in addition to those described. One, for example, is the introduction of a scale-of-two divider in the down clock input to counter 123. The effect of this is to make the counter a decision device that distinguishes between compression factors greater or less than one-half, that is, expansion factors less or greater than two. Such a configuration may be of significance in connection with other processing modes.

FIG. 7 illustrates a logic circuitry used to generate the write and read addresses for the memory 84. The two sets of addresses are generated by separate 8-bit counters, namely, the write counter 91′ and the read counter 92′ of the address networks 91 and 92 respectively. The read counter 92′ is designed to be pre-set whereas the write address counter 91′ is not. This is done by designing the read counter 92′ so that an arbitrary initial value can be set into it as in the case of the counter 123 of the compression-expansion comparator 95, so that counting thereafter proceeds from this value. Each of the counters 91′ and 92′ has an 8-input NAND gate associated with it to indicate when the counter has reached the value representing the selected value of the discard interval. The gate 141 relates to the read address counter 92′ and the gate 142 to the write address counter 91′.

The operator can select specific values of the discard interval by means of a bank of four discard interval switches 97*a*, 97*b*, 97*c*, and 97*d*. Altogether, the switches offer 16 different combined settings, whereby the normalized discard interval can be varied approximately in increments of 1.7 milliseconds from a minimum of 1.7 to a maximum of 26.6 milliseconds. Each individual switch controls three of the NOR gates 143–154. In each group of three NOR gates one controls the length of the discard interval with respect to the write addressing, one controls the length with respect to the read addressing, and one controls the extent to which the discard interval is randomly reduced when such reduction is called for by the operator. In descending order of bit significance, as the bits are counted by the counters 91′ and 92′, and the order of function as described above, these NOR gates are numbered 143 through 154 inclusive. NOR gates 143 through 154 operate in their stated roles in the following manner.

Consider, for example, the gate 143 which has a role typical of eight out of the 12. When the switch 97*a* is in the ground position the output of the gate 143 will be the complement of the most significant bit (MSB) of counter 91', and the output of the inverter 155 will be the true value of the MSB. The use of a NOR gate and an external inverter is equivalent to an OR gate and either configuration may be used. On the other hand, if switch 97*a* is in the positive voltage position, the output of the inverter 155 is fixed at binary (or logical) one. Consequently, if all four of the switches 97 are moved to the ground position, the counter 91' must count up to eight binary ones (decimal 255) in order to present all ones to the NAND 142; but if, for example, the switch 97*a* only is moved to the positive voltage position, a count of seven binary ones with a leading (MSB) zero, i.e., decimal 127, will provide an all ones input to the NAND 142.

The NAND gate 142 measures the discard interval. When all ones are present at its inputs, the counter 91' has, by definition, counted out one discard interval from the initial (all zeros) state of the counter 91'. This is true regardless of compression or expansion because the measurement is normalized to a compression/expansion factor of unity. Thus, the positions of switches 97*a, b, c*, and *d*, control the length of the discard interval. In order that the reading cover the same portion of the memory 84 as writing, the four most significant bits of the input to the NAND gate 141 are controlled in parallel with the corresponding inputs to the NAND gate 142.

NOR gates 145, 148, 151 and 154 control the extent to which the discard interval can be randomly reduced. The random reduction is produced by resetting the read address counter 92' to some random value, instead of to all zeros, after the discard interval value has been reached as indicated by NAND 141. This operation appears to be contrary to the prior statement that the counters 92' and 91' should cover the same range of locations in memory 84. The operation is justified, however, by the high degree of redundancy in speech and music, a characteristic which is fundamental to compression by deletion and expansion by repetition as performed in the present invention. The random values are determined by the six least significant bits of the word in the output buffer 86. These values are at random with respect to the resetting times of counter 92' because their source is non-coherent with the timing of counter 92'.

When the discard interval is at its maximum value, all six bits obtained from buffer 86 are used for the random reset of the counter 92', if the operator elects to use random reset. These bits operate to condition the six least significant bits in the counter 92'. In this case, the counter may start from any initial value from zero to decimal 63 inclusive. That is, the initial value may represent up to one-quarter of the full count (decimal 255), when the discard interval value is reached. If a reduced value of the discard interval is selected by switches 97, a preset value as high as decimal 63 may be too high for the counter 92'. For this reason the NOR gates 145, 148, 151 and 154 are associated with switches 97*a*, 97*b*, 97*c*, and 97*d* respectively. Thus, when the upper bound of the discard interval is reduced, the extent of the random range is correspondingly shortened. While it is understood that the correspondence is not numerically exact, it does represent a compromise for the sake of avoiding complexity in the hardware between no shortening of the random range and exact shortening that could be attained through the use of currently available arithmetic logic devices. It will also be recognized that the inversions introduced by the NOR gates do not affect the long-term distributions of the random bits.

Control over the discard interval could also be attained by using a presettable counter for write address counter 91'. In this case, the preset value of the read counter 92'(other than random preset, if any) should be made to coincide with that of the write counter 91'. Also, random presetting of the write counter 91', in concert with random presetting of the read counter 92' may be provided. As stated above, the redundant character of the signal being processed makes this nonessential. In addition, it is possible to introduce randomization of the discard interval by control of the NAND gates 141 and 142 with random signals. This could be done by using configurations typified by the switch 97*a*, gate 143, and inverter 155, except that the manual switch would be replaced or supplemented by a suitable means, such as a one-bit buffer, for presenting a random binary state instead of the deterministic state provided by the switch. In this case, coordination would be provided between the counters 92' and 91' taking into account their differences in rate.

In FIG. 7 the write pulses WRT from the priority logic circuit 78 (see FIG. 4) are fed to the COUNT and CLEAR inputs of counter 91', as appropriate, in the following manner. When the NAND gate 142 does not have all ones presented to it, its output allows the NAND gate 163 to pass the WRT (complemented as a practical convenience by an inverter 164) to the COUNT input. At the same time, NAND gate 165 is blocked so that the WRT pulse is not passed to the CLEAR input. When all ones are presented to the NAND gate 142 it blocks the NAND gate 163, thereby temporarily inhibiting further counting in the write counter 91'. At the same time, the output of the NAND gate 142, through an inverter 166, conditionally enables NAND gate 165. The conditionality is governed by NAND gate 167 which receives inputs from the mode selector switch 98 and NAND gate 141. If the switch 98 is moved to the ground position, the output of NAND gate 167 is unconditionally plus. In this case the next WRT pulse will be passed via inverter 168 to the CLEAR input of the counter 91'. When the counter 91' is cleared, NAND gate 142 will not have an all ones input, and counting can continue again in counter 91'.

If the mode selector switch 98 is in the positive voltage position, the output of NAND gate 167 will be plus only if the output of the NAND gate 141 is low; a low output from the NAND gate 141 signifies that its input is all ones, that is, that the counter 92' has counted up to the selected discard interval value. Thus, the effect of throwing the switch 98 to a plus voltage is to cause clearing of the counter 91' to be conditional on the count in the counter 92'. In this case, the sequence of actions of the counter 91' is count, pause until counter 92' counts up to the discard interval, clear, count, pause, etc.

In the third position of the mode selector switch 98, $\overline{KL}$ is connected to the NAND gate 167. The $\overline{KL}$ then governs whether the pause is to occur before clearing of counter 91'. If $\overline{KL}$, subject to the operator-selected bias (see FIG. 6) indicates compression, in which case it is high or plus, the pause is invoked while the counter 92' counts to the discard interval. If $\overline{KL}$ is low, indicating expansion, the counter 91' is cleared without a pause after it reaches the discard interval count.

The read pulses, that is, the RSTB signals, are fed in somewhat similar fashion to the read counter 92'. However, here three functions are required to be performed, namely, count, clear, and load. The load function is used conditionally, when a random reset is desired by the operator. The load function is alternative to the clear function in this application. If non-random reset is desired, the counter is cleared after it reaches the discard interval count, and counting recommences from all zeros. If random reset is desired, the counter is loaded, i.e., preset, to a count determined by the six least significant bits of the output buffer 86, as gated by the NOR gates 145, 148, 151 and 154, and presented to the date inputs of counter 92'.

When the output of the NAND 141 is high, i.e., the count in the counter 92' is not the discard interval, the NAND gate 169 is enabled and the RSTB pulses are passed to the COUNT input of the read counter 92'. At the same time, the NOR gate 170 is inhibited and the NAND gate 171 is inhibited via the NOR gate 172. These inhibitions prevent clearing and loading. When the counter 92' counts to the discard interval, the output of the NAND gate 141 goes low, inhibiting the NAND gate 169 and halting counting. At the same time, either the gate 170 or the gate 171 is enabled, depending upon the setting of the random reset switch 99.

If the random reset switch 99 is moved to the ground position, the output of the NOR gate 172 is the complement of the output of the NAND gate 141. Thus, if the counter 92' is at the discard interval value, the output of the NAND gate 141 is low, the output of the NOR gate 172 is high, and the RSTB pulse is passed to the LOAD input of counter 92' via NAND gate 171. A count other than the discard interval value is thereby preset into the counter 92', the output of the NAND gate 141 rises, and the counting is allowed to recommence in the counter 92' on the next RSTB pulse. If the switch 99 is moved to the plus position (high), the NAND gate 173 will pass the RSTB pulses. When the output of the NAND gate 141 is low, the NOR gate 170 will pass the RSTB pulses inverted by the NAND gate 173 and a command is thereby applied to the CLEAR input of the counter 92'. When the counter 92' is cleared, the output of the NAND gate 141 goes high and the counting recommences on the next RSTB pulse. The complementary arrangement of gates 171 and 172 on the one hand, and the gates 170 and 173 on the other provides the required choice between clearing and presetting when the counter 92' reaches the discard interval value.

In the third position of the random reset switch 99, the choice between the clearing and presetting is made automatically in accordance with the state of $\overline{KL}$. If the level is high, implying compression, the counter 92' is cleared to all zeros after counting to the discard interval. If $\overline{KL}$ is low, implying expansion, the counter 92' is preset to a random, non-zero value after counting to the discard interval.

Thus, the switches 97, 98, 99 and 101 provide a variety of manual and automated controls over the manner in which the electronic apparatus herein described performs its functions. It is to be understood that the specific descriptions given here are by way of example, and not limiting. For example, the action of $\overline{KL}$ in controlling the counters 91' and 92' could be inverted with respect to either or both of these counters.

FIG. 8 illustrates an alternative embodiment of memory addressing. In this figure a presettable counter is used for the write address counter 91'. As in FIG. 7, deterministic durations of the discard interval are selectable by switching, and this switching influences the count lengths equally in the write and in the read addressing cycles. In addition, random reductions in count length may be introduced at the discretion of the operator into read addressing. Similarly to FIG. 7, the discretionary random reduction in FIG. 8 is automatically programmed in accordance with the selected duration of the discard interval.

The counters 91' and 92' and the switches 97*a*, 97]b, 97*c*, 97*d*, 98 and 99 play the same roles in FIG. 8 as in the case of FIG. 7. When the counter 91' reaches the count of all ones the output of the NAND gate 201 goes low. The output of the NAND gate 201 is sampled between successive write counts by the pulse 10 derived from the CIPG (the same pulse that clocks the latch 113 as described in connection with FIGS. 5A and 5B). Sampling is performed by the latch 202, and the timing of the clock to the latch 202 is such that the outputs of the latch 202 are fixed during the time of the WRT pulse. The complementary output of the latch 202 is used so that if there are all ones at the input of the NAND gate 201, there is a high level output from latch 202. This level prevents the WRT pulse complement (the WRT pulse inverted by the inverter 203) from being passed by the NOR gate 204, thereby temporarily inhibiting counting. The WRT pulses and the output of the latch 202 are applied to the three-input NAND gate 205. The third input to the 205 gate is a level from the read NAND gate 206, gated via the NAND 207 by a level from the switch 98. The devices 205, 206, 207 and 98 perform the same function in FIG. 8 with respect to counter 91' as do devices 165, 141, 167 and 98 in the case of FIG. 7 except that the LOAD, rather than the CLEAR command input is controlled. When a pulse delayed by the MV 224 is applied to the LOAD input, the four least significant bits of the counter 91' are set to zero and the four most significant bits are set in accordance with the positions of the switches 97. The MV 224 is required so that the loading takes place at the trailing edge of the WRT pulses just as in the case of counting. In response to the loading of even one zero into the counter 91', the output of the NAND gate 201 will rise. Without the latch 202 this change in the output of 201 would affect the gating of the WRT pulse that is intended for the LOAD. The effect would be to split the pulse between LOAD and COUNT and this would cause the counter 91' to generate improper count lengths.

The function of the latch 208 with respect to the counter 92' and the NAND gate 206 is much the same as that of the latch 202 with respect to the counter 91' and the NAND gate 201. Latch 208 is clocked by the RSTB pretrigger pulse 3, FIG. 5, generated by the MV 111. As long as the counter 92' is not all ones the output of the NAND gate 206 is high and the direct output of the latch 208 is also high, allowing the NAND gate 209 to pass the RSTB pulses to the COUNT input of the counter 92'. At the same time, the NAND gate 210 is inhibited. When the counter 92' reaches all ones the NAND 209 is inhibited and the NAND gate 210 is enabled. The NAND gate 210 passes one RSTB pulse to the LOAD input of section *b* of the counter 92′. In FIG. 8 the counter 92′ consists of a cascade of two four-bit counters. One four-bit counter section a generates the four least significant bits, and the other section *b* generates the four most significant bits. The same RSTB pulse is also passed to the NOR gates 211 and 212. The NOR gates 211 and 212 are controlled by the random reset switch 99 to provide a choice of deterministic or random loading of the lower order bits. If deterministic loading is selected, the RSTB pulse is directed by the NOR gate 211 to the CLEAR input of section *a* of the counter 92′; together with loading of section *b* of the counter 92′ under the control of the discard interval switches 97, the same count is preset in the counter 92′ as is preset in the counter 91′.

If random loading is selected, the NOR gate 212 passes the RSTB pulse to the LOAD input of section a of the counter 92′ thereby conditionally loading the four least significant bits, present at that moment in the buffer 86. The conditionality consists, in part, of that described in connection with FIG. 7; i.e., the number of bits which is allowed to be randomized is a function of the settings of the switches 97. In addition, as stated in connection with the description of FIG. 7, randomization in the loading of the counter 92′ is restricted to shortening the count length. Consequently, if a deterministic zero is potentially to be loaded into a given bit position, it may be overruled by a random one, subject to the rules relating randomization of bits to the selection of the discard interval and to the operator's election of randomization. If, in that given bit position, a deterministic one is to be loaded, it may not be overruled by a random zero. The inverters and the gates 213 through 223 inclusive effect this result.

The difference in the complexity of gating associated with the loading of the two sections of counter 92′ arises solely from the choice of components and it is understood that other devices may be used. Because the four bits loaded into section *b* of the counter 92′ may always have any of the sixteen values that they are able jointly to assume, it is desirable always to pulse the LOAD input for this operation. Since the two most significant bits in the section b of counter 92′ are always deterministic, and the two least significant bits in the section a are always random if randomization is elected, these four bits are not required to be gated as are the other four.

FIGS. 9 and 10 illustrate further embodiments of the invention.

Briefly stated, FIG. 9 illustrates an embodiment in which two memories are used. In this embodiment, while one memory is devoted to writing, the other is devoted to reading, and these functions are interchanged from time to time. In general, each action of writing or reading is performed over a natural sequence of memory locations, and the start and end locations of each sequence may differ from sequence to sequence. FIG. 9 shows the use of random-access memories to realize these requirements. The capability for random access is unnecessary for action through a natural sequence, but it is advantageous for arbitrary selection of start locations. However, it is not essential. The high-speed capabilities of known shift registers with non-destructive read out makes it possible to realize the general plan of FIG. 9 with such devices instead of random-access memories.

One method for using shift registers in the circuit FIG. 9 involves the employment of two shift counters. One of these is used to shift the register at the rate required by writing or reading sequences. When the need to move rapidly to a non-adjacent location occurs, the second counter is called upon. This counter has a very high rate sufficient to shift the register to the next required address location within the time allowed by the writing and reading functions.

A system for compression and expansion of speech was previously discussed wherein the following characteristics were suggested, namely, high-frequency cut-off of input signal at 4,800 Hz, maximum number of memory locations 256. If such a system were operated at practical upper limits the read rate might be 19.2 kHz corresponding to a pitch change of one octave, and the write rate might be appreciably higher. The term "practical" is intended to mean changes within ranges likely to be meaningful to users. Theoretical limits, however, exceed these ranges. If the write rate is higher than the read rate, then part of the input must be discarded as shown in FIG. 1. In this case the read interval is longer than the write interval and, because of the discarding, the read interval is the minimum time in which a large address change must be made.

For these conditions the worst case of high-speed shifting is a change of 255 locations in 52 microseconds, i.e., at a rate of about 5MHz which is readily attainable. If a higher performance system is necessary, e.g., one with a high-frequency cut-off of 20 kHz and 1,024 memory locations, a high-speed rate in the order of 80 MHz is implied. And, if the number of memory locations is doubled again to improve the handling of low-frequency signals, the high-speed rate also has to be doubled. But the need for such speed can be mitigated at the price of additional complication in hardware. For example, each of the two shift registers might be replaced by a bank of *n* registers. Then the data assigned to location 1 would be stored in register 1, the data for location 2 in register 2, the data for location *n* in register *n*. The data for location $n+1$ would be assigned to register 1, data for location $n+2$ to register 2, the data for location 2 *n* to register *n*, etc. Then, the high-speed rate could be divided by *n*. The general principle of this method of using shift registers instead of random-access memories are applicable also to the circuits of FIGS. 4 and 10.

Studies of time compression and expansion show that subjective considerations may impose a lower limit on segmentation of the input signal. Segmentation is illustrated in FIGS. 1 and 2, where one segment consists of adjacent M and N portions. In the configuration of FIG. 4, it is generally desirable that the capacity of the memory be sufficient to enable the required segment length to be read out between the times when the read and write addresses coincide. When one of these addresses catches up with the other, because of the different rates of the timers 71 and 77, the read-out is effectively forced to jump to a different segment from the one being read out immediately before the address cross-over. Alternatively, or in addition to other means discussed herein, the following logic may be utilized to obtain adequate segment length from the configuration of FIG. 4.

When the read and write addresses coincide, the read-address counter 92 is reset to its initial value or to a value equal to half its highest value, as may optionally be determined by logic shown in FIGS. 7 and 8 (these values are herein denoted for convenience as location 1 or $w/2$), in accordance with the following table, wherein RAD=read address, WAD=write address, and $k$=frequency of the timer 71 divided by frequency of the timer 77:

| | WAD>$W/2$ | WAD<$w/2$ |
|---|---|---|
| $k>1$ | RAD=$w/2$ | RAD=1 |
| $k<1$ | RAD=1 | RAD=$w/2$ |

A logical decision unit mechanizes this table as follows. If the number of write addresses in total is an integral power of 2, it is necessary to inspect only the most significant bit of the write address to determine in which column of the table RAD should be looked up. If the number if not an integral power of 2, a single gating structure of a conventional design may be used to examine all flip flops except that generating the least significant bit.

The state of $k$, that is, the row of the table in which RAD should be looked up may be determined by an up-down counter as in FIG. 6. When a coincidence gate of a well-known type senses that the read and write addresses are the same, it commands the decision unit to sense the state of the up-down counter to determine whether the ratio $k$ is greater or less than unity. At the same time, the decision unit measures WAD against $w/2$, and then selects the appropriate reset value for read address counter 92 in accordance with the logic table.

FIG. 9 illustrates an embodiment in which two memory banks are used. In the general terms of FIG. 3, FIG. 9 omits certain parts such as transport mechanism 40 and speed control 39 whereas components forming the storage 34 and the programer 42 are shown in detail. It has been pointed out previously that FIGS. 1 and 2 represent compression and expansion, respectively, in a very general manner, and that many different patterns of discarding and repeating are possible in accordance with detailed variations in logical embodiments of the present invention. For example, mode selector switch 98 and other switches in FIG. 4 offer variations which have been described in detail, and it is to be understood that other variations may be used. Thus, variations in details of processing are also obtainable in a two-memory-bank embodiment as will be discussed, and it is to be understood that such variations have advantages in the processing of signals which exhibit different characteristics. To some extent, the same operational patterns are obtainable with one memory bank or two, but other patterns are uniquely related to the hardware configurations which generate them.

The choice of one memory bank or two not only influences the logic of processing, but it affects the selection of hardware elements for physical reduction to the practice of embodiments of the invention described herein. If one memory bank is used it is desirable that read priority logic, such as logic circuit 78 of FIG. 4, or write priority logic be provided. Such logic is unessential with two memory banks and is omitted in FIG. 9. Again, if one memory bank is used, it is desirable that a random-access memory be chosen although a more strictly ordered memory (for example, a shift register) can be used as has been described. Where two memory banks are used, strictly ordered memories are very simple to use.

Specifically in FIG. 9, variable oscillator 38 drives analog-to-digital converter timer 311. Timer 311 provides timing signals for analog-to-digital converter 32 and its associated sample-and-hold amplifier. Timer 311 also provides timing signals, either directly or indirectly via converter-amplifier combination 32 to AND gates 320 and 330. The timing signals applied to AND gates 320 and 330 are applied through OR gates 321 and 331 to address counters 317 and 327 respectively when data samples from converter 32 are to be written into one or the other of the memories associated with the said counters.

Through the use of two memories, it is possible to separate the write and read functions instead of interlacing them as is the case when one memory is used. Thus, in FIG. 9 generally, when data samples are being written into memory 313, previously written samples are being read out of memory 325 and vice versa. The choice of which memory is in the write state and which in read at any instant is governed by flip-flop 340. As is characteristic of many flip-flops, flip-flop 340 has two outputs, one of which is high at any instant and the other low. For convenience in setting forth this description but without intention to be restrictive, it is assumed that a high input enables an AND gate and a low input inhibits an AND gate. Consequently, when flip-flop 340 applies an enabling signal to AND gate 320, it simultaneously inhibits AND gate 330.

At such time (subject to the state of another signal applied to AND gate 320 from mode switch 347 which will be described below), write timing signals from timer 311 directly or indirectly are applied via AND gate 320 and OR gate 321 to address counter 317. Simultaneously, AND gate 332 is enabled by flip-flop 340 to pass read timing signals controlled by variable oscillator 43 and generated by pulser 346 via OR gate 331 to address counter 327. Also at such time, AND gate 322 is inhibited, preventing read timing signals from reaching counter 317. When the state of flip-flop 340 reverses, write timing signals may be applied to counter 327 and read timing signals to counter 317.

At the same time that flip-flop 340 conditionally enables AND gate 320, it also enables a bank of AND gates represented by the single AND gate 312. It is to be understood throughout this description that broad arrows, such as that flowing from converter 32 to the bank of AND gates 312, represent a multiplicity of closely related parallel signals. In general, gating of parallel (time-coincident) signals requires as many parallel gates as there are such signals. In FIG. 9 it is assumed that the signal output of converter 32 is a parallel digital word, and there are as many AND gates in bank of AND gates 312 as there are bits in the output word of converter 32. It is to be understood that the output word of converter 32 need not necessarily be parallel, but may be serial or serial-parallel and the organization of the gates, memories, etc., which handle the output words will reflect the format that is chosen. Since the word format is not central to the invention herein described, a specific format has been arbitrarily chosen for description. This choice is not intended to be restrictive and is used only to avoid unnecessarily complicating the description. It is to be further understood that this generality concerning word format applies as well to other embodiments described herein such as that of FIGS. 4 and 10.

When AND gates 312 are enabled, data words from converter 32 are written into successive locations in memory 313 under control of address counter 317. With some types of memory devices it may be desirable to apply a WRITE (or $\overline{\text{READ}}$, etc.) logical signal to the memory when writing into it is desired. Since writing is conditional upon a signal from mode switch 347, it may also be desirable to apply a similar conditional signal to AND gates 312 or to memory 313 etc. It is to be understood that such signals are related to specific choices of hardware rather than to the basic principles of this invention and, consequently, they have not been shown in FIG. 9.

At the same time that AND gates 312 are enabled, bank of AND gates 314 (represented by a single gate) is inhibited. At this time also AND gate 332 and bank of AND gates 326 are enabled so that signal samples (represented by data words generated by converter 32) are read out of memory 325 and applied via bank of OR gates 315 and optional bank of integrators 316 to digital-to-analog converter 35 which produces the output signal. The bank of integrators may take any desired form as, for instance, a resistor-capacitor integrator or a buffer as shown in FIG. 4. The integrators are optional, depending upon the effect of discontinuities in the read-out of memories 313 and 325 upon converter 35.

Thus, for a specific state of flip-flop 340, memory 313 is devoted to writing and memory 325 is devoted to reading. When the state of flip-flop 340 is reversed, the roles of the memories are reversed. In this manner the writing rate is governed by oscillator 38 and the reading rate by oscillator 43 so that the appropriate input/output rates are provided for compression or expansion and for pitch-retention or pitch-modification as has been discussed in connection with FIGS. 1, 2, 3 and 4. The specific logic by which flip-flop 340 is called upon to exchange the activities of the two memories is controlled by mode switch 347. While switch 347 is shown as having only five positions which provide for five modes, it is to be understood that any desired number of positions and, therefore, modes may be used. Other modes are possible.

The AND gate 318 is connected to address counter 317 so that when said counter counts up to its maximum value, the output of said gate reflects this condition. As has been shown in FIGS. 7 and 8, the maximum effective count can be shortened, either deterministically or randomly. The counter lengths of 317 and 327 may be different. Since in compression, part of the input is discarded, and in expansion, part of the input is repeated, said possible difference in length will add to the complexity of the discard or repetition pattern but will not necessarily affect the basic mode of operation. The AND gate 328 provides the same function for address counter 327 as AND gate 318 provides for address counter 317. The output of AND gate 318 is further gated by AND gates 319 and 323, and the output of AND gate 328 by AND gates 329 and 333, so that indications associated with writing are directed to OR gate 334 and indications associated with reading are directed to OR gate 335.

The outputs of OR gates 334 and 335, directly or indirectly, control the clocking of flip-flop 340, thereby causing said flip-flop to command exchange of the write-read roles of memories 313 and 325. In the position in which mode switch 347 is shown in FIG. 9, flip-flop 340 is clocked by OR gate 334. In this case flip-flop 340 commands the exchange of memory roles when the counter associated with the memory in the write mode reaches it maximum effective count. If this occurs in compression, part of the signal in the read-mode memory will be discarded; if it occurs in expansion the address counter of the read-mode memory may recycle and repeat read-out of data in that memory. Because of this possible recycling, the signal that clocks flip-flop 340 may also reset address counters 317 and 327 or command some other initial values for said counters in accordance with the maximum effective counts assigned to each of them. In the same position of mode switch 347, a second section thereof applies a high logic-level signal to an input of each of AND gates 320 and 330. Subject to the rules arbitrarily selected here by way of illustration, a high level applied to an input has the effect of enabling, so that for this position of mode switch 347 AND gates 320 and 330 will always pass write clock pulses when enabled by flip-flop 340.

The position in which mode switch 347 is shown in FIG. 9 may be denoted Position 1, the adjacent position Position 2, etc. In Position 2, flip-flop 340 is clocked by OR gate 335, which responds to address counters 317 and 327 when the memories associated with said counters are in the read mode. In this case, it may be desirable to mechanize the following optional rule:

> Provide an auxiliary memory for each of address counters 317 and 327. For each counter the auxiliary memory will remember the maximum count attained by its associated counter when the associated main memory 313 or 325 was in the write mode. Then, when the counter which selects read locations reaches the remembered value, an equal-to gating structure of a known type will signal the counter to reset and begin counting again from whatever initial value is assigned. In this manner, in expansion, reading of blank locations in main memory will be avoided.

An input of each of AND gates 320 and 330 is fed a fixed high logic level via mode switch 347 as in Position 1; this connection is also made in Positions 3 and 5.

In Position 3 of mode switch 347, flip-flop 340 is clocked by a signal from AND gate 338. Said AND gate is driven, in turn, by latches 336 and 337. The latches are memory devices, which obey the following rules: when one latch is reset the output falls, and when the input is thereafter driven high the output goes high and remains so, even when the input falls, until the latch is reset again. Thus, when address counter 317 reaches its maximum effective value, AND gate 318 will cause the output of latch 336 to rise, and said output will stay high even though counter 317 may recycle. Similarly, the output of latch 337 will lock in its high state the first time that address counter 327 reaches its maximum effective value after latch 337 has been reset. Consequently, when at least one complete cycle of writing has been completed in one memory of memories 313 and 325, and at least one complete cycle of reading has been completed in the other of said memories, the output of AND gate 338 will rise. (By "complete cycle" is meant, in this particular context, writing or reading in all locations which may be selected by the programming of counters 317 and 327.) When the output of said AND gate 338 rises, flip-flop 340 is clocked, and latches 336 and 337 are reset through optional delay 339. Then, the write-read exchange cycle is ready to repeat.

In Position 4 of mode switch 347, flip-flop 340 is clocked by OR gate 335 as in Position 2. The difference between the modes called by Positions 2 and 4 is due to the section of switch 347 that connects to AND gates 320 and 330. In the former position, a fixed high level is applied by the switch; in the latter, the output of OR gate 334 is inverted by inverter 341 and applied to the said AND gates 320 and 330. Then, when the output of the address counter of the main memory that is in the write mode reaches its maximum effective value, the output of OR gate 334 via inverter 341 will inhibit AND gates 320 and 330, causing address counting in association with that memory to stop until the address counters are reset by the signal from OR gate 335 (and flip-flop 340 changes state). If this mode, called by Position 4 of mode switch 347 is to be used in expansion, it may be desirable to mechanize the optional rule described in connection with Position 2 of the said switch.

In Position 5 of mode switch 347 the mode is programmed by compression/expansion comparator 342, which is similar to comparator 95 of FIG. 4. The comparator 95 is more particularly shown in FIG. 6. The output of comparator 342 may be high when the write rate is faster than the read rate, or vice versa. In addition, the output may be logically biased, as described in connection with FIGS. 4 and 6. The output of said comparator is applied directly to AND gate 345 and via inverter 348 to AND gate 344. Thus, in compression, one of said AND gates is enabled and the other is inhibited by said comparator, and in expansion the states of said AND gates are reversed. Another input to AND gate 345 is the output of OR gate 335, and another input to AND gate 344 is the output of OR gate 334. The outputs of the AND gates 344 and 345 provide the inputs to OR gate 343, and the output of OR gate 343 clocks flip-flop 340 via mode selector switch 347. In this manner, an adaptive choice of modes may be attained. It is to be understood that the choice of modes which may be selected adaptively is not limited to those which can be made manually in Positions 1 and 2 of mode selector switch 347. For example, the choice might be between the modes corresponding to Positions 3 and 4 of said switch, etc.

The configuration of FIG. 9 is a flexible one. For example, FIG. 9 can readily be expanded to provide for dichotic compression. This mode of operation may be understood by reference to FIG. 1B. This figure shows the input being dissected, with alternate sections being joined to provide an output while the intervening sections are discarded. In dichotic compression the output shown in FIG. 1B (all M's) is only one of two outputs, while the other output consists of the conjoined sections ordinarily discarded (all N's). For convenience, a listener to dichotically compressed audible signals usually wears a pair of earphones, one of the outputs being fed to one earphone, and the other output to the other earphone.

There are many ways in which the configuration of FIG. 9 can be modified for dichotic compression. For example, each of memories 313 and 325, and each of address counters 317 and 327 can be duplicated. Then, writing into the original and added memories will take place much as in unmodified FIG. 9, with data being written into memory 313 or alternately into memory 325, under control of address counter 317 or 327 respectively. At the same time that a signal segment is stored in one of said memories, it is stored in parallel in the memory added thereto. In reading, both the basic and the duplicate address counters are used to provide separate addressing of the two memories which were written into in parallel. One of said counters is preset for the beginning of the read-out count as in unmodified FIG. 9, the other counter is preset to a value intermediate between the lowest and highest counts used by the first counter. Said intermediate value may simply be the average of said extremes or it may be weighted in accordance with the ratio of M to N in FIG. 1. Since the ratio of M to N is uniquely related to the ratio of the rates of the read and write clock signals generated by generator 346 and timer 311, said weighting can be produced by suitable arithmetic units of well known types.

With simple presetting of one of the counters as described immediately above, information corresponding to M in FIG. 1 will be read out of one memory and information corresponding to N plus part of M will be read out of the other memory. With weighted presetting, one output can be made to correspond exactly to M and the other to N. Since N is shown arbitrarily shorter than M in FIG. 1, N will be read out more quickly than M. To prevent gaps in the readout of N, it may be desirable to cause the N-associated address counter to recycle in such a manner as to repeat part of N.

In general, duplication of memories for dichotic processing may also require duplication of groups of gates 314, 315 and 326, group of optional integrators 316, and converter 35. However, it may be preferable to use time division multiplexing of the outputs of memories which are simultaneously in the read mode, and to share output channels up to and including the converter, with demultiplexing performed on the analog signal. Demultiplexing might also be performed at some other intermediate point.

As an alternative to the use of two address counters in readout, one such counter may be used in conjunction with an arithmetic unit of a well known type so that for every step of the counter two addresses are formed. This is possible because the arithmetic relationship between the two addresses is readily determined as was described above in connection with the subject of presetting the counters if two are used.

As an alternative to the use of two memories for dichotic readout, one memory may be used in a manner simulating two as follows. For each pair of read addresses that is generated, two readouts are obtained from the same memory, one readout corresponding to one member of the said pair of addresses, and the other readout corresponding to the other member of the said pair. With reference to FIG. 1, one of these readouts generates the M output, and the other generates the N output. In general, it is desirable to time-interleave the readout pairs, but it is not essential, there being known storage media suitable for non-interleaved readouts. Similarly, a random-access memory is desirable but not essential for this purpose. As has been previously described, the present invention lends itself to embodiments in which the desired characteristics of a random-access memory can be simulated by one more strictly ordered.

It is to be understood that dichotic compression as described above can also be accomplished in the embodiment of FIG. 4 by means of paired readouts which may or may not be time-interleaved in accordance with the characteristics of the particular type of memory chosen.

It was pointed out previously that the choice of one memory bank or two influences the logical modes of processing, aside from the issue of dichotic compression. For example, when only one memory is used, and N in FIGS. 1 and 2 is much less than M, the effective length of M tends to increase. This situation is easy to obtain with one memory, but difficult or unobtainable with two. However, it is a desirable situation for the processing of certain types of input signals. At the same time, elimination of read-priority or write-priority logic is also potentially desirable and such elimination generally implies the use of more than one memory. Both of these desirable conditions are readily obtained through the use of three memories. The relationship of N to M depends upon the ratio of the write and read rates of the main memory or memories. Thus, the said relationship applies to pitch modification as well as to time-compression or time-expansion, or combinations thereof.

FIG. 10 illustrates an embodiment in which three memory banks are used. In the general terms of FIG. 3, FIG. 10 omits certain parts such as transport mechanism 40 and speed control 39, whereas components forming the storage 34 and the programmer 42 are shown in detail. As in the case of the two-memory-bank embodiment, the three-memory-bank embodiment lends itself more readily to the use of a relatively strictly ordered type of memory (such as a shift register) than does the one-memory-bank embodiment, for which a random-access memory is preferable, although not essential. Similarly, the three-memory-bank embodiment does not require a read (or write) priority logic means as is desirable in the case of the one-memory-bank embodiment.

Specifically, in FIG. 10, variable oscillator 38 drives analog-to-digital converter timer 411. Timer 411 provides timing signals for analog-to-digital converter 32 and its associated sample-and-hold amplifier. Timer 411 also provides timing signals, either directly or indirectly via converter-amplifier combination 32 to write address counter 424. In turn, the output of counter 424 controls other units, as shown in FIG. 10.

Through the use of three memories it is possible to separate the write and read functions. Thus, in FIG. 10 generally, when data samples are being written into one of memories 413, 416 or 419, previously written samples are being read out of one of the two remaining memories. The choice of which memory is in the write state and which in the read state at any instant is governed by write and read address selectors 434 and 435, in accordance with commands from program control 437. In general, reading follows the same order as writing. For example, if writing in memory 413 is followed by 416, then by 419, and returns to 413, reading will be in the same order. However, as will be pointed out, certain exceptions to this generality may be desirable. In general also, the progression of reading within a given memory may be the same as the progression of writing.

The effective lengths of write and read address counters 424 and 429 are flexible and may be controlled by compression/expansion comparator 433 and program control 437, generally in the manner in which write and read address counters 91' and 92' are controlled in FIGS. 7 and 8. In addition, the effective lengths may change not only from time to time, but also in accordance with the counter-memory assignments made by write and read address selectors 434 and 435. Read address counter 429 is clocked by pulse generator 428, which in turn is timed by variable oscillator 43. As in FIGS. 4 and 9, the compression-expansion comparator (identified as 433 in FIG. 10) indicates whether the write-read timing ratio is greater or less than one; and, as in FIGS. 4 and 9, said comparator may be further governed by a logical bias control.

Data input samples, converted to digital format, are admitted to memory 413 under the control of the bank of AND gates 412. As in FIG. 9, a broad arrow indicates a multiplicity of parallel signals, and in general the gate symbol into which such an arrow flows indicates a bank of gates. It is to be understood here, as previously, that signals which are shown for convenience as being parallel may in fact be formatted serially or in serial-parallel. Data output samples are read out of memory 413 under the control of the bank of AND gates 414 and thence through bank of OR gates 421 through optional bank of integrators 422 to digital-to-analog converter 423 which generates the output signal. Comments concerning type and manner of use of bank of integrators 316 in FIG. 9 apply as well to bank of integrators 422.

Similarly, data input signals are admitted to memory 416 under the control of the AND gates 415 and data outputs are similarly controlled by AND gates 417. Inputs are admitted to memory 419 under the control of the AND gates 418 and the outputs are similarly controlled by AND gates 420. These AND gates are conditioned or set as required by write and read address selectors 434 and 435. For example, if memory 413 is to be in the write mode, bank of AND gates 412 is enabled by write address selector 434. At the same time, write address signals are applied to said memory from write address counter 424 by enablement of bank of AND gates 425 and thence through bank of OR gates 438. If required by the particular type of memory device used, a write command signal may be sent to said memory by selector 434. Also, for example, if memory 419 is to be in the read mode, bank of AND gates 420 is enabled by read address selector 435. At the same time, read address signals are applied to said memory from read address counter 429 by enablement of bank of AND gates 432 and thence through bank of OR gates 440. If required by the particular type of memory device used, a read command signal may be sent to said memory by selector 435. Banks of AND gates 426 and 427 perform functions similar to AND gates 425, and banks of AND gates 430 and 431 perform functions similar to AND gates 432.

In general, write address counter 424 cycles through the maximum effective or selected count continuously at a rate determined by oscillator 38, and the length of its cycle may change from time to time as previously discussed. Similarly, read address counter 429 generally cycles continuously at a rate determined by oscillator 43, and its cycle length is also subject to being varied. In addition, the counting of one or the other or both of the said counters may be interrupted from time to time, in accordance with certain processing modes as has been discussed with respect to the comparable counters in connection with FIGS. 4 and 9. When write address counter 424 completes a counting cycle to the extent permitted by program control 437, it transmits a signal to said program control, indicating that writing has been completed, for that cycle, in the memory currently enabled for writing. Similarly, when read address counter 429 completes a counting cycle to the extent permitted by program control 437, it transmits a signal to said program control indicating that reading has been completed for that cycle in the memory currently enabled for reading.

When an end-of-write or end-of-read signal as described in the preceding paragraph is received by program control 437, it transmits a responsive command to write address selector 434 or to ead address selector 435, respectively, or both, in accordance with the program then in effect and also in accordance with information from memory-number comparator 436. Several possible programs are described below by way of example. The transmission of a responsive command from program control 437 may be virtually instantaneous or it may be intentionally delayed, in accordance with the requirements of individual programs of which the apparatus herein described is capable.

When a command from program control 437 as described in the preceding paragraph is received by either of address selectors 434 or 435, the receiving selector causes its related function (write or read) to be transferred from the memory which was performing that function immediately before the receipt of said command to the memory next in order. The order in which memories are selected has previously been discussed as is in general 413, 416, 419, 413, etc., but as has also been previously discussed there may be exceptions. In particular, it has already been stated that writing and reading in the three-memory-bank embodiment of FIG. 10 are performed in separate memories at any one time. Since writing and reading are asynchronous, being governed by asynchronous oscillators 38 and 43, writing may be completed in memory 413 while reading is still ongoing in memory 416, or reading may be completed in memory 419 while writing is still ongoing in memory 413, etc. To prevent potential interference between writing and reading due to this asynchronism in the rates of the said two functions, memory-number comparator 436 has been provided.

If at any time either of address selectors 434 and 435 should incipiently call for transfer of its function to a memory currently performing the function controlled by its companion selector, the incipient resulting interference will be determined by memory-number comparator 436. Comparator 436 will then alarm program control 437. Program control 437 will in turn generate a command or commands for address selector 434 or 435, or both, in accordance with the particular program then in effect. The said command(s) will cause the address selectors to enable their separate functions in separate memories.

It is to be understood that the timing order of signals implied in the preceding paragraph is by way of example only. in another possible order, information from selectors 434 and 435 would make it possible for comparator 436 in conjunction with program control 437 to predict potential interference even before the moment during which it is incipient. In accordance with the preceding paragraph, when interference is incipient, program control 437 quickly generates an additional signal or signals for address selector 434 or 435 or both tc correct said interference. It is to be understood from the present paragraph that logic may alternatively be embodied so that signals appropriate to non-interfering operation are generated in one step instead of two. The logical embodiments described in this and the preceding paragraph can readily be constructed through the use of well known logical devices.

Possible program modes under which the embodiment of FIG. 10 may operate are described below. Selection of modes may be performed by a multi-position switch 441 in conjunction with program control 437, similar to switch 347 in FIG. 9. It is to be understood that the following modes are by way of example only and are not intended to be limiting.

1. When writing or reading concludes in a given memory while the opposite function is ongoing in the next memory in order, the function just concluded is transferred to the second next memory. In this mode, for example, if writing concludes in memory 413 while reading is ongoing in memory 416, writing will next be commanded in memory 419.
2. When writing or reading concludes in a given memory while the opposite function is ongoing in the next memory in order, the function just concluded is nevertheless transferred to said next memory and the function previously ongoing in said memory is transferred to the memory next beyond that in which the function was ongoing. In this made, for example, if reading concludes in memory 416 while writing is ongoing in memory 419, reading is transferred to memory 419 and writing to memory 413. In the case where reading overrides writing, the memory where this occurs will, in general, contain blanks or outdated data in the locations beyond that where the last information was written before the transfer from writing to reading. Consequently, reading immediately following the incomplete writing should desirably cover only those locations containing current information. To embody this desirable condition an auxiliary temporary memory could be provided to remember the address of the location containing the last current information. This auxiliary memory, in conjunction with a simple optional comparator, might cause program control 437 to command transfer of reading to the next higher memory immediately after the address stored for this purpose in the auxiliary memory is reached.
3. When writing concludes in a given memory it is transferred to the next higher memory with priority over reading. Thus, if writing concludes in memory 413, it is transferred to memory 416, even though reading may be ongoing in memory 416, and if reding is ongoing in memory 416, it is interrrupted and transferred to memory 419. However, when reading concludes in a given memory, if writing is ongoing in the next higher memory, then reading is transferred to the second next memory, and writing is not disturbed. For example, if reading concludes in memory 413 while writing is ongoing in memory 416, reading is transferred to memory 419.
4. When reading concludes in a given memory, it is transferred to the next higher memory with priority over writing. That is, this fourth mode is the converse of the third mode. In this case it may be desirable to provide an auxiliary address memory as was described in conjunction with the second mode. In the second and fourth modes an alternative logic making use of the optional auxiliary address memory and optional comparator may be preferred. In this case, when the address of the last location containing current information is reached, earlier locations in the memory will be reread until a total number of locations has been read equal to the number of locations that would have been written into had writing not been interrupted.

As in the one- and two-memory-bank embodiments illustrated in FIGS. 4 and 9, the choice of operating modes for the three-memory-bank embodiment may be deterministic or adaptive. Adaptivity may be controlled by the output of compression/expansion comparator 433.

Dichotic compression is possible with the embodiment of FIG. 10 just as with those of FIGS. 4 and 9. In general, the various approaches to modifying FIG. 9 for dichotic compression are applicable also to FIG. 10 except that so much as has been said regarding duplication of address counters or an alternative thereto in the case of FIG. 9 need apply only to the read address counter in FIG. 10. Furthermore, in a three-memory-bank embodiment, there are always *two* memories at any one time in which writing is *not* taking place. Then reading can be performed simultaneously and separately in the two non-writing memories with reading starting at the lowest (usual) address in one memory and at an intermediate or other address in the other memory. The choice of the intermediate address may be made as in the analogous case described in connection with FIG. 9.

Up to this point, where the use of digital signals for processing according to the principles of the subject invention has been described, it has generally been implied that each digital word should independently describe a sampled signal level. It is to be understood that this limitation does not in fact exist. While it has been convenient to discuss operation in terms of independently measured samples, samples can just as well be measured in relative terms. That is, each succeeding sample of the input signal can be measured in terms of its difference in amplitude from the preceding one rather than in absolute terms. Then the output can be generated by an iterative reconstruction process. The basic principles of such sampled-data systems are well known. Examples include differential pulse code modulation and delta modulation. However, the application of these principles to a means for compressing or expanding the time of a signal is believed to constitute new art. It is to be further understood that just as the invention described herein can be reduced to practice by temporary storage of segments of the input signal in either digital or analog form, if the storage is in analog form, the samples may represent absolute or relative values. That is, differential analog signals may be processed as well as differential digital signals.

The principles of the present invention may be accomplished by means of various other devices such as scan-conversion tubes, ultrasonic light modulators, photochromic storage, etc., as explained below.

Scan Conversion Tubes

The signal to be processed can be reproduced from its original recording medium and transferred to the storage surface of a scan-conversion tube. The storage may be in a variety of formats, that is, the signal may be represented by varying "tones" of an electronic gray scale, or the signal may first be translated to a digital representation by a known type of analog-to-digital converter. In the latter case, the signal is stored on the storage surface by means of groups of marks with each mark representing a digital bit. The storage surface then performs the function of limited storage as described in connection with storage device 34 of FIG. 1 Read out in a scan-conversion tube is generally performed by an electron gun separate from that used for write in. Consequently the read rate can readily be made different from the write rate. If there is a substantial degree of commonality between the write and read electron optics, the write and read functions can be logically interlaced, generally in accordance with the techniques disclosed by FIGS. 4, 5A and 5B herein. Unlike electromechanical machines, the storage capacity in the scan-conversion tube can readily be changed (i.e., reduced from its maximum). This can be controlled by means of the write electron optics, the read electron optics, or both.

Ultrasonic Light Modulator

If the signal to be processed is introduced into a suitable transparent medium as an elastic wave, it will be stored in the medium with a life equal to the length of the medium in the direction of the wave divided by the velocity of propagation of the wave in the medium. The amount of information stored is measured by the product of the storage life and the temporal frequency of the stored signal. Read-out is effected by probing local variations in the index of refraction of the storage medium using visible or near-visible light. The refractive variations represent the stored signal wave. The probing light source is desirably a highly concentrated one such as a laser or arc lamp. The light may be scanned mechanically, by electro-optically active crystals, or by other suitable means so as to read the stored signal at a rate different from that at which the signal is written. The effective size of storage can be reduced by limiting the read-out scan to a portion of the medium wherein the input signal is temporarily stored.

Surface-Acoustic-Wave Delay Line

The surface-acoustic-wave delay line is also a suitable device for time compression and expansion. If separate signals are introduced into the opposite ends of such a line and an output is extracted from an intermediate location, the output is a convolution product of the inputs. If one of the inputs is a variably delayed impulse, the output is a variably delayed replica of the other input. It is the capability that makes the surface-acoustic wave delay line applicable to time expansion and compression.

Photochromic Storage

A photochromic medium may be used for storage, with the storage configured as in the case of the scan-conversion tube. In the case of the photochromic medium, however, beams of light instead of electron beams are used for write-in, read-out, and, if required, erasure. A photochrome with a suitably fast fade rate might obviate the need for an independent erase process. In an alternative configuration, the photochrome could be made to move, e.g., to revolve, so as to simplify the light-scanning mechanisms.

Other Areas of Application

The apparatus in accordance with the invention can be used readily to transpose musical scales and introduce novel effects in the recording and performance of musical compositions. The apparatus can be used to aid soloists in practicing. Recordings are available of musical compositions in which the accompaniment is performed but the solo part is omitted. Thus, the soloist can practice against an appropriate background. If the tempo or pitch or both of such a recording does not suit a soloist, he can adjust these parameters individually to meet his own interpretation of the composition. Also, if he desires, he can reduce the tempo substantially for his beginning practice while maintaining correct pitch.

While only certain embodiments of the invention have been illustrated and described, it is apparent that alteration changes and modifications may be made without departing from the scope and spirit of the invention as defined by the appended claims.

What is claimed is:

1. Apparatus for treating a.c. signals to selectively modify time and pitch comprising means for storing segmental portions of said signals, write operation means capable of entering said segmental portions of said signals to fill the entirety of said storing means, read operation means for extracting at least part of said segmental portions from the entirety of said storing means, the rate of operation of at least one of said operation means being continuously variable relative to the rate of the other, programming control means regulating the interrelationship and precedence of performance of both of said operation means whereby the entire capacity of said storing means is utilized by said operation means and thereby the effective capacity of said storing means is maximized, said programming control means including at least one continuously variable means for modifying the rate of one of said operation means relative to the other and means for interlacing said operation means in accordance with their continuously variable differential rates and output means to produce modified a.c. signals from said extracted parts of said segmental portions, the first said a.c. signals being reproduced from a recording medium having variable speed driving means and means coordinating the rate of at least one of said read and write operation means with the rate of transport of said recording medium, the last said means including frequency generating means regulating the rate of at least one of said read and write operation means and said generating means and the driving means being related to coordinate the generated frequency and the speed of the driving means.

2. Apparatus according to claim 1 wherein said modified a.c. signals are recorded on a recording medium and the rate of at least one of said read and write operation means is coordinated with the rate of transport of said recording medium.

3. Apparatus according to claim 1 including adjustable means for changing the effective duration of said segments.

4. Apparatus for treating a.c. signals to selectively modify time and pitch comprising means for storing segmental portions of said signals, write operation means capable of entering said segmental portions of said signals to fill the entirety of said storing means, read operation means for extracting at least part of said segmental portions from the entirety of said storing means, the rate of operation of at least one of said operation means being continuously variable relative to the rate of the other, programming control means regulating the interrelationship and precedence of performance of both of said operation means whereby the entire capacity of said storing means is utilized by said operation means and thereby the effective capacity of said storing means is maximized, said programming control means including at least one continuously variable means for modifying the rate of one of said operation means relative to the other and means for interlacing said operation means in accordance with their continuously variable differential rates and output means to produce modified a.c. signals from said extracted parts of said segmental portions and including adjustable means for changing the effective duration of said segments selectively in a random manner limited according to specified logical rules.

5. Apparatus for treating a.c. signals to selectively modify time and pitch comprising means for storing segmental portions of said signals, write operation means capable of entering said segmental portions of said signals to fill the entirety of said storing means, read operation means for extracting at least part of said segmental portions from the entirety of said storing means, the rate of operation of at least one of said operation means being continuously variable relative to the rate of the other, programming control means regulating the interrelationship and precedence of performance of both of said operation means whereby the entire capacity of said storing means is utilized by said operation means and thereby the effective capacity of said storing means is maximized, said programming control means including at least one continuously variable means for modifying the rate of one of said operation means relative to the other and means for interlacing said operation means in accordance with their continuously variable differential rates and output means to produce modified a.c. signals from said extracted parts of said segmental portions and manually operated means for selecting one of a plurality of combinations of operational modes of said read and write operation means.

6. Apparatus according to claim 5 wherein said means for manually selected said modes includes means for causing said modes to be formed at least in part by logical structures responding adaptively to changes in the relative rates of said read and write operation means.

7. Apparatus for treating a.c. signals to selectively modify time and pitch comprising means for storing segmental portions of said signals, write operation means capable of entering said segmental portions of said signals to fill the entirety of said storing means, read operation means for extracting at least part of said segmental portions from the entirety of said storing means, the rate of operation of at least one of said operation means being continuously variable relative to the rate of the other, programming control means regulating the interrelationship and precedence of performance of both of said operation means whereby the entire capacity of said storing means is utilized by said operation means and thereby the effective capacity of said storing means is maximized, said programming control means including at least one continuously variable means for modifying the rate of one of said operation means relative to the other and means for interlacing said operation means in accordance with their continuously variable differential rates and output means to produce modified a.c. signals from said extracted parts of said segmental portions, said programming means selectively controlling said read operation means relative to said write operation means to read out parts of certain segments to effect compression and to read out all of certain segments and repeat at least portions of such segments to effect expansion.

8. Apparatus for treating a.c. signals according to claim 7 including an analog-to-digital converter for modifying the signals to be stored, said storing means including a digital memory and said output means including a digital-to-analog converter.

9. Apparatus for treating a.c. signals according to claim 8 including at least one storing means wherein said programming means includes a priority logic circuit enabling one operation and delaying the other operation until said one operation is completed to prevent said operations from occurring coincidentally within said storing means.

10. Apparatus for treating a.c. signals according to claim 8 wherein said analog-to-digital converter converts said analog signals into digital signals.

11. Apparatus according to claim 8 including a selector switch for discarding digits of a certain level from the digital words being read out of said storing means and thereby establishing the level of resolution in the digital-to-analog conversion.

12. Apparatus according to claim 7 including means for effecting dichotic compression or expansion comprising second output means, means for selectively controlling said read-out means to cause certain parts of certain segments to be read out through one of said output means and other parts of said segments to be read out through the other of said output means, said read out parts being at least in part temporally different parts of said read out segments.

13. Apparatus according to claim 12 including means for partitioning said read out parts according to a predetermined rule.

14. Apparatus according to claim 12 including means for partitioning said read out parts in accordance with the ratio of the rates of said read and write operations.

15. Apparatus according to claim 7 including a buffer for receiving said a.c. signals and feeding said signals to said storing means, said buffer storing a portion of said signals during the read operation and feeding said signals including the stored portion of said signals during the write operation.

16. Apparatus according to claim 7 wherein said modified a.c. signals are recorded on a recording medium and the rate of at least one of said read and write operation means is coordinated with the rate of transport of said recording medium.

17. Apparatus for treating a.c. signals according to claim 7 wherein said output means includes a buffer for receiving and storing outputs from said read operation means and acting as an interface means between said storing means and said output means during the time of a write operation.

18. Apparatus according to claim 7 wherein said storing means includes a plurality of storing devices and said apparatus further includes means for temporally separating said read and write operations so that at any one time any one of said storage devices is devoted solely to only one of said operations.

19. Apparatus for treating a.c. signals to selectively modify time and pitch comprising means for storing segmental portions of said signals, write operation means capable of entering said segmental portions of said signals to fill the entirety of said storing means, read operation means for extracting at least part of said segmental portions from the entirety of said storing means, the rate of operation of at least one of said operation means being continuously variable relative to the rate of the other, programming control means regulating the interrelationship and precedence of performance of both of said operation means whereby the entire capacity of said storing means is utilized by said operation means and thereby the effective capacity of said storing means is maximized, said programming control means including at least one continuously variable means for modifying the rate of one of said operation means relative to the other and means for interlacing said operation means in accordance with their continuously variable differential rates and output means to produce modified a.c. signals from said extracted parts of said segmental portions, said programming means including a priority logic circuit enabling one operation and delaying the other operation until said one operation is completed to prevent said operations from occurring coincidentally within said storing means.

20. Apparatus according to claim 19 wherein said programming means includes an address network having an address selector and means including address counters connected with said address selector to control said read and write operations.

21. Apparatus for treating signals according to claim 20 wherein said programming means further includes an up-down counter for varying the logic of the control effected by said programming means.

22. Apparatus according to claim 20 including switching means connected to the addressing means for controlling the duration of individual segments of the signal being processed.

23. Apparatus according to claim 20 including a mode selector switch connected to said programming means for establishing the modes of writing and reading said signals stored in said storing means.

24. The apparatus according to claim 20 including means for varying the effective capacity of said storing means by setting the addressing means whereby the durations of the segments being read out of said storage means are varied at random.

25. Apparatus for treating a.c. signals according to claim 19 wherein said output means includes a buffer for receiving and storing outputs from said read operation means and acting as an interface means between said storing means and said output means during the time of a write operation.

26. Apparatus according to claim 19 wherein said storing means includes a plurality of storing devices and said apparatus further includes means for temporally separating said read out write operations so that at any one time any one of said storage devices is devoted solely to only one of said operations.

27. Apparatus according to claim 19 wherein said modified a.c. signals are recorded on a recording medium and the rate of at least one of said read and write operation means is coordinated with the rate of transport of said recording medium.

28. Apparatus according to claim 19 including adjustable means for changing the effective duration of said segments.

29. Apparatus according to claim 19 including a buffer for receiving said a.c. signals and feeding said signals to said storing means, said buffer storing a portion of said signals during the read operation and feeding said signals including the stored portion of said signals during the write operation.

30. Apparatus according to claim 19 including a buffer for receiving said a.c. signals and feeding said signals to said storing means, said buffer storing a portion of said signals during the read operation and feeding said signals including the stored portion of said signals during the write operation.

* * * * *